US011074269B2

United States Patent
Ezick et al.

(10) Patent No.: US 11,074,269 B2
(45) Date of Patent: Jul. 27, 2021

(54) SYSTEMS AND METHODS FOR CONFIGURING SYSTEM MEMORY FOR EXTRACTION OF LATENT INFORMATION FROM BIG DATA

(71) Applicant: Reservoir Labs, Inc., New York, NY (US)

(72) Inventors: James Ezick, Canonsburg, PA (US); Thomas Henretty, Brooklyn, NY (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 165 days.

(21) Appl. No.: 16/244,832

(22) Filed: Jan. 10, 2019

(65) Prior Publication Data

US 2019/0317945 A1  Oct. 17, 2019

Related U.S. Application Data

(60) Provisional application No. 62/615,803, filed on Jan. 10, 2018.

(51) Int. Cl.
| | | |
|---|---|---|
| *G06F 17/00* | (2019.01) | |
| *G06F 16/25* | (2019.01) | |
| *G06F 16/22* | (2019.01) | |
| *G06F 16/93* | (2019.01) | |
| *G06F 3/06* | (2006.01) | |
| *G06N 3/02* | (2006.01) | |

(Continued)

(52) U.S. Cl.
CPC .......... *G06F 16/254* (2019.01); *G06F 3/0604* (2013.01); *G06F 3/0631* (2013.01);
(Continued)

(58) Field of Classification Search
CPC .. G06F 16/254; G06F 16/258; G06F 16/2228; G06F 16/93; G06F 16/2477; G06F 16/3344; G06F 16/2465; G06F 40/30; G06F 40/20; G06F 3/0631; G06F 3/0673; G06F 3/0604; G06F 16/932477; G06N 3/02;
(Continued)

(56) References Cited

U.S. PATENT DOCUMENTS 9,471,377 B2 * 10/2016 Baskaran ............... G06F 9/4881
10,224,119 B1 * 3/2019 Heinrich ............. G06F 16/3344
(Continued)

OTHER PUBLICATIONS

Yanchun Zhang and Guandong Xu. 2008. Using Web Clustering for Web Communities Mining and Analysis. In Proceedings of the 2008 IEEE/WIC/ACM International Conference on Web Intelligence and Intelligent Agent Technology—vol. 01, IEEE Computer Society, USA, (Dec. 20-31, 2008).*

(Continued)

*Primary Examiner* — Greta L Robinson
(74) *Attorney, Agent, or Firm* — Goodwin Procter LLP

(57) ABSTRACT

A system for extracting latent information from data includes obtaining or generating components of the data, where the data components include scores indicating how the component relates to the data. Memory is allocated for the components and the components are stored in the allocated memory. The components are then transformed into documents using a suitable transformation function, and the documents are analyzed using natural language processing, to extract latent information contained in the data.

51 Claims, 18 Drawing Sheets

(51) Int. Cl.
*G06F 40/30* (2020.01)
*G06F 40/20* (2020.01)

(52) U.S. Cl.
CPC ........ *G06F 3/0673* (2013.01); *G06F 16/2228* (2019.01); *G06F 16/258* (2019.01); *G06F 16/93* (2019.01); *G06F 40/20* (2020.01); *G06F 40/30* (2020.01); *G06N 3/02* (2013.01)

(58) Field of Classification Search
CPC ........ G06N 3/088; G06N 5/022; G06N 20/00; H04L 63/1416
See application file for complete search history.

(56) References Cited

U.S. PATENT DOCUMENTS

| | | | |
|---|---|---|---|
| 10,614,073 B2* | 4/2020 | Zhang | G06Q 40/04 |
| 2005/0043936 A1* | 2/2005 | Corston-Oliver | G06F 16/3344 704/4 |
| 2010/0185578 A1* | 7/2010 | Chi | G06Q 30/02 706/52 |
| 2016/0300149 A1* | 10/2016 | Nickel | G06K 9/00 |
| 2018/0293506 A1* | 10/2018 | Lee | G06N 5/04 |

OTHER PUBLICATIONS

Evangelos E. Papalexakis, Christos Faloutsos, and Nicholas D. Sidiropoulos. Tensors for Data Mining and Data Fusion: Models, Applications, and Scalable Algorithms. ACM Trans. Intell. Syst. Technol. 8, 2, Article 16, 44 pages, (Jan. 2017).*

* cited by examiner

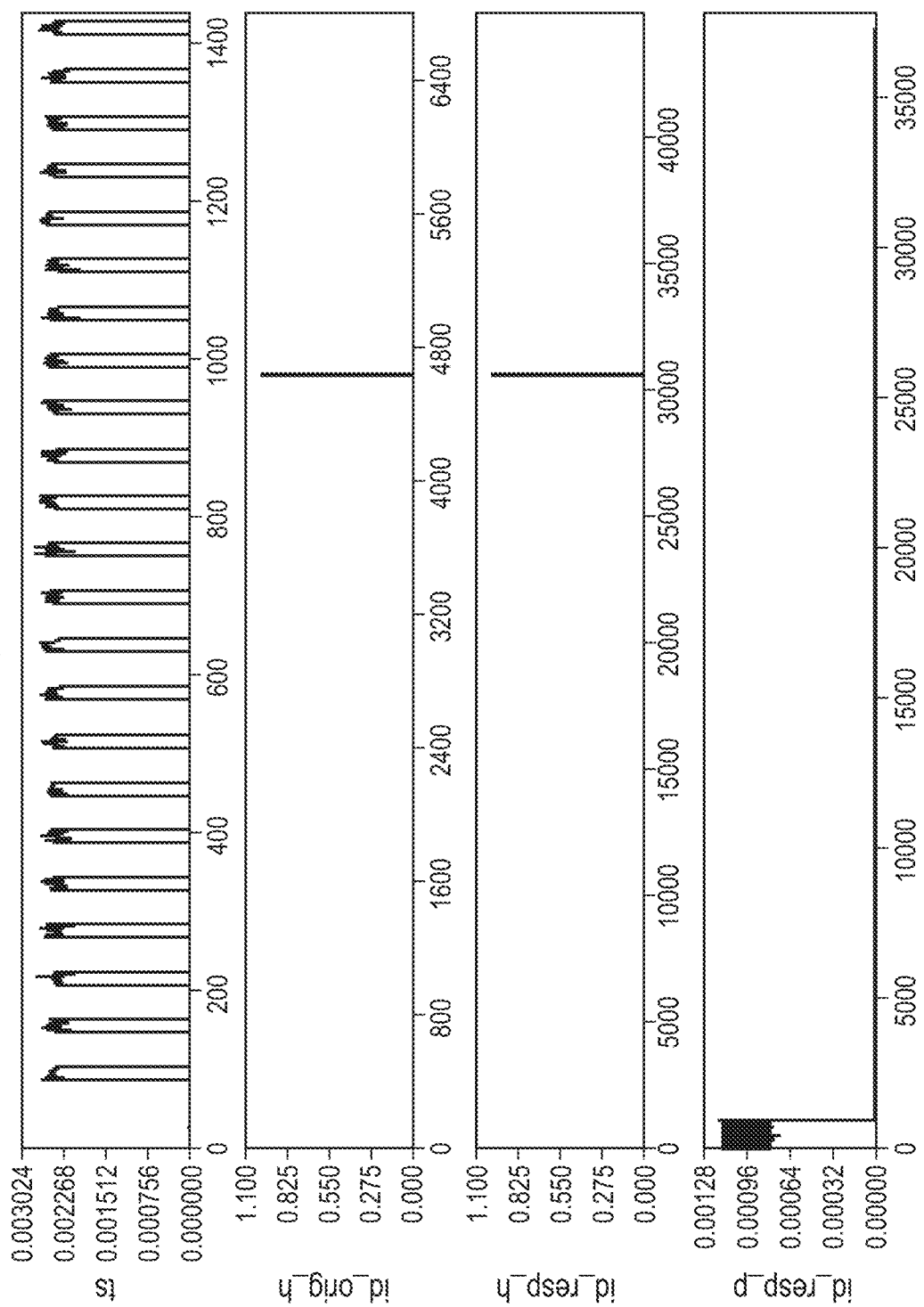

SYSTEMS AND METHODS FOR CONFIGURING SYSTEM MEMORY FOR EXTRACTION OF LATENT INFORMATION FROM BIG DATA

CROSS-REFERENCE TO RELATED APPLICATIONS

This application claims benefit of priority to U.S. Provisional Patent Application Ser. No. 62/615,803 entitled "Systems and Methods for Tensor Decomposition," filed on Jan. 10, 2018, the contents of which are incorporated herein by reference in their entirety.

FIELD OF THE INVENTION

This disclosure generally relates to configuring computing systems for analyzing big data and, in particular, to the systems and methods for configuring system memory that allows transformation of datasets into documents, where latent information may be extracted from the documents using natural language processing.

BACKGROUND

Today's highly interconnected world is experiencing a problem of information explosion. Raw streams of data are available from numerous sources, such as sensors distributed throughout a region that can measure temperature, noise level, air quality, traffic congestion, etc.; audio and video feeds from several monitors; exchange of messages on social media; etc. While all these data streams, individually or as a collection, contain valuable information, e.g., a threat in a public space or cyberspace, increasing interest in a certain social activity, etc., real-time analysis of the voluminous data that are available, and extraction of meaningful information via such analyses are challenging problems. As the sources and size of the available data increases, the problem of deciphering latent information from the available data is becoming increasingly complex.

For example, in the cybersecurity domain, threat identification and intrusion detection from network traffic data are notoriously difficult problems to solve. Traditional signature-based approaches are often thwarted by the dynamic and evolving nature of modern cyber threats. It is nearly impossible to define signatures for what is or is not normal in a generalized manner across many different networks. Even on a given network, the expected behaviors may change from day to day. Furthermore, because of the transience of identity in the IP address and port space, it may not be possible to write coherent rules that capture all activities of concern.

The application of cutting-edge data analytics to network traffic logs has also struggled to surpass the shortcomings of classical signature-based systems. Supervised machine learning techniques encounter the same key problem—it is not realistic to specify, a priori, normal versus abnormal behavior. Approaches that rely on training a model based on large volumes of historical data are hindered by another issue—because of the sensitive nature of network traffic, there is very little publicly-available training data, and that data typically cannot be generalized in a meaningful way to a user's own network.

In the geospatial analytics domain, an analyst cannot just observe a known entity and/or look for a known behavior. To be effective, the modern analyst must discover previously unknown, anomalous, or emerging behavior. Further, the amount of intelligence data is overwhelming. The volume of geospatial intelligence data has exploded with the maturation of Internet, mobile phone, and social media technology. Hence there is a critical need for effective analytics for geospatial Big Data. Furthermore, in order to identify the "unknown unknowns" in a large, rapidly growing body of data, breakthrough analytics must be developed. In other application domains, such as analysis of interactions of chemical compounds, analysis of materials subjected to various physical conditions such as stress, temperature, pressure, etc., also the amount of data that is available for analysis is increasing rapidly. In many application areas, the available datasets are frequently on the order of millions to billions of multidimensional data points, and extraction of valuable information that is contained but is hidden or is latent is generally a challenge. Therefore, there is a need for efficient analysis techniques and systems for real-time or fast analysis of large datasets representing data from a diverse range of application domains.

SUMMARY

Various processes and systems are described herein that enable efficient analysis of large datasets using unsupervised machine learning techniques that provide analysis without the burden, bias, and inherent limitations of supervised techniques that generally categorize only the known behavior. Using the unsupervised techniques, however, latent information that was not even known to exist in the dataset and/or that was not expected, can be extracted. To this end, in various embodiments a dataset is first represented as a tensor (a multi-dimensional array structure), and the tensor is decomposed into various tensor components. Each tensor component is then transformed into a representation called a document. Unsupervised pattern discovery is then performed by analyzing. These documents are then analyzed using natural language processing (NLP), an unsupervised learning technique, that can discover latent patterns. The discovered patterns can be expected or unexpected, i.e., patterns that are not only not expected to exist in the dataset that was analyzed but simply not known to exist at all, in any dataset. The discovered patterns are then described using the characteristics of the different dimensions of the tensor, where such characteristics (also called labels) are meaningful to a reader. Thus, information that is otherwise hidden in a dataset can be revealed and described in a meaningful way to a user.

While tensor decomposition techniques such as CANDECOMP/PARAFAC (CP) decomposition and Tucker decomposition are known, these techniques merely produce tensor components and are not focused on further analysis of the components. In order to produce meaningful, interpretable results, large datasets, having thousands, hundreds of thousands, millions, billions, or even more multidimensional data points, that are represented as tensors typically need to be decomposed into thousands of components. Tensor decomposition can reveal patterns-of-activity without upfront classification of normal versus abnormal behavior. Further, tensor analysis is feasible in an arbitrary number (e.g., 3, 5, 10, 30, 200, 500, 1000, or more) of dimensions (also called modes) and thus can detect complicated relationships between several data attributes or characteristics represented by different modes simultaneously.

Manual real-time analysis of these patterns in an operational environment is not feasible, however. Usually, an analyst who is both a domain expert and is trained in tensor mathematics must define the tensor analysis to be performed. Also, while tensor analysis can detect patterns and anomalies in large multidimensional datasets, such analysis typically requires intensive manual inspection of the decomposed tensor components by an expert analyst. Therefore, barriers remain to the widespread use of tensors for analysis of complex datasets.

To facilitate fast or even real-time (i.e., within a few seconds or a few minutes) analysis of tensor components various embodiments employ a customized processor adapted to perform natural language processing (NLP). One type of NLP includes topic modeling for clustering and classification of tensor components. Topic modeling cannot be applied directly to tensor components, however. The tensor components obtained from the tensor decomposition are therefore transformed into "documents" where the structure of these documents is based on information about (labels or indices of) the tensor modes. When applied to these documents, topic modeling can extract from numerous tensor components the patterns that are latent in the analyzed dataset. Using the structure of these documents, the extracted patterns can be expressed using the mode labels, providing the latent information in a human readable form.

Accordingly, in one aspect, a method is provided for configuring memory of a computing system for extraction of latent information from data. The data includes a first dataset represented in a first index space, and the method includes obtaining a number of components of the data, where the components include a set of components of the first dataset. Each component in the number of components includes several scores associated with a second index space that is different from the first index space. A respective label is associated with each index in the second index space.

The method also includes allocating in the memory, for each one of one or more components of the number of components, a respective block of memory that is designated as a vector. The size of the vector is at least equal to a total number of labels corresponding to non-zero scores in at least one of the one or more components. The method further includes, for each component of the number of components, storing in the respective vector, scores corresponding to a number of labels associated with the second index space. In storing different vectors corresponding to different components, a common label sequence is used.

The method additionally includes generating several documents, wherein each document corresponds to a respective component and is obtained by applying a transform function to the vector corresponding to that component, and analyzing the several documents using a processor adapted to perform natural language processing (NLP). Analysis from the NLP is expressed using one or more labels associated with the second index space, thereby describing latent information contained in the data. The size of the second index space may be less than the size of the first index space.

In some embodiments, the data includes a second dataset represented in the first index space, and obtaining the number of components of the data includes obtaining a set of components of the second dataset. In some embodiments, the number of components of the data are obtained by classifying the first dataset into a number of classes. The size of the second index space is equal to the number of classes. The classification may be performed using a processor configured as an artificial neural network.

In some embodiments, the method includes prior to the allocating step, scaling one or more labels in the second index space, which results in a modification the second index space. The scaling may either include compression or expansion of the one or more labels. If the scaling includes compression, the method includes aggregating one or more scores corresponding to the one or more scaled labels. Otherwise, i.e., if the scaling includes expansion, the method includes dividing the one or more scores over expanded labels.

In some embodiments, the first dataset includes a first tensor having N modes, where N≥3. The index range of the k-th mode is $I_k$, where $I_k \geq 1$. The size of the first index space is $\Pi_{k=0}^{N-1} I_k$ and the labels associated with the second index space are associated with indices of modes of the first tensor. The set of components of the first tensor may be generated using one or more decompositions of the first tensor. At least one of the one or more decompositions includes a CANDECOMP/PARAFAC (CP) decomposition or a Tucker decomposition. The size of the second index space is $\Sigma_{k=0}^{N-1} I_k$. A total number of components that forms the set of components of the first tensor may either be specified for at least one of the one or more decompositions or may be selected automatically by at least one of the one or more decompositions.

In some embodiments, the set of components of the first tensor is generated using several tensor decompositions, where each decomposition provides a subset of components in the set of components. The number of components provided o included in a first subset can be different from the number of components provided or included in a second subset. In some embodiments, obtaining the set of components of the first tensor includes performing one or more CANDECOMP/PARAFAC (CP) decomposition of the first tensor and/or one or more Tucker decomposition of the first tensor. In some embodiments, the data includes a second dataset that includes a second tensor also having N modes. Obtaining the number of components of the data includes obtaining a set of components of the second tensor that are generated using one or more decompositions of the second tensor. The one or more decompositions may include a CP decomposition and/or a Tucker decomposition.

In some embodiments, the method includes prior to the allocating step, scaling one or more labels associated with one or more modes of the first tensor, which results in a modification the second index space. The scaling may either include compression or expansion of the one or more labels. If the scaling includes compression, the method includes aggregating one or more scores corresponding to the one or more scaled labels. Otherwise, i.e., if the scaling includes expansion, the method includes dividing the one or more scores over expanded labels. Each score in a first collection of scores associated with a first component may range from 0 to 1, and the first component may have a weight.

In some embodiments, allocating a first block of memory that is designated as a first vector corresponding to a first component includes allocating several non-continuous sub-blocks of memory. A first sub-block of memory may be accessed from memory associated with a first processor and a second sub-block of memory may be accessed from memory associated with a second processor. Allocating a first block of memory that is designated as a first vector corresponding to a first component may also include allocating at least one memory location corresponding to at least one metadata parameter associated with the number of components of the data. The topics may be expressed using the one or more metadata parameters.

In some embodiments, the transform function includes, for each component of the number of components of the data, multiplying each score in the vector corresponding to that component with a weight associated with that component. Alternatively, the transform function may include, for each component of the number of components of the data, multiplying each score in the vector corresponding to that component with a specified constant.

In some embodiments, the natural language processing (NLP) includes topic modeling. The processor adapted to perform the NLP may be programmed to identify one or more topics from the several documents, and to express each topic in terms of a sequence of probabilities. Each probability in the sequence may correspond to a respective label in the common label sequence. Topic modeling may include one or more of: Latent Dirichlet Allocation (LDA), Hierarchical Dirichlet Process (HDP), Dynamic Topic Model (DTM), and Hierarchical LDA (HLDA). The topic modeling technique may automatically determine a number of topics to be identified.

In some embodiments, the first dataset includes a first tensor having N modes, wherein $N \geq 3$. The method further includes partitioning at least one topic as a set of archetype components, wherein each archetype component in the set corresponds to a respective mode of the first tensor. Each archetype component includes one or more probability values associated with one or more labels of the respective mode. The method also includes, for each archetype component, scaling each probability value such that sum of the probability values in that archetype component is equal to 1.0.

In another aspect, a system is provided for configuring memory used in extraction of latent information from data. The data includes a first dataset represented in a first index space. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to obtain a number of components of the data, where the components include a set of components of the first dataset. Each component in the number of components includes several scores associated with a second index space that is different from the first index space. A respective label is associated with each index in the second index space.

The instructions also program the processing unit to allocate in the memory module, for each one of one or more components of the number of components, a respective block of memory that is designated as a vector. The size of the vector is at least equal to a total number of labels corresponding to non-zero scores in at least one of the one or more components. The instructions further program the processing unit to store in the respective vector for each component of the number of components, scores corresponding to a number of labels associated with the second index space. For storing different vectors corresponding to different components, a common label sequence is used. In addition, the instructions program the processing unit to generate several documents, wherein each document corresponds to a respective component and, for generating a document from a particular component, the instructions program the processing unit to apply a transform function to the vector corresponding to that component. In various embodiments, the instructions can program the processing unit to perform one or more of the additional method steps described above.

In some embodiments, the processing unit includes a custom processor adapted to analyze the several documents using natural language processing (NLP), wherein analysis from the NLP is expressed using one or more labels associated with the second index space, thereby describing latent information contained in the data. Alternatively, in some embodiments, the instructions program the processing unit to analyze the several documents using NLP, wherein analysis from the NLP is expressed using one or more labels associated with the second index space, thereby describing latent information contained in the data.

In another aspect, an article of manufacture is provided that includes a non-transitory storage medium having stored therein instructions which, when executed by a processing unit program the processing unit, which is in electronic communication with a memory module, for configuring memory used in extraction of latent information from data. To this end, the instructions in the first memory program the processing unit to obtain a number of components of the data, where the components include a set of components of the first dataset. Each component in the number of components includes several scores associated with a second index space that is different from the first index space. A respective label is associated with each index in the second index space.

The instructions also program the processing unit to allocate in the memory module, for each one of one or more components of the number of components, a respective block of memory that is designated as a vector. The size of the vector is at least equal to a total number of labels corresponding to non-zero scores in at least one of the one or more components. The instructions further program the processing unit to store in the respective vector for each component of the number of components, scores corresponding to a number of labels associated with the second index space. For storing different vectors corresponding to different components, a common label sequence is used.

In addition, the instructions program the processing unit to generate several documents, wherein each document corresponds to a respective component, and to analyze the several documents using natural language processing (NLP), wherein analysis from the NLP is expressed using one or more labels associated with the second index space, thereby describing latent information contained in the data. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIGS. 7B-7D depict data components that correspond to the archetype shown in FIG. 7A;

DETAILED DESCRIPTION

Tensor Decomposition

Figure 1:
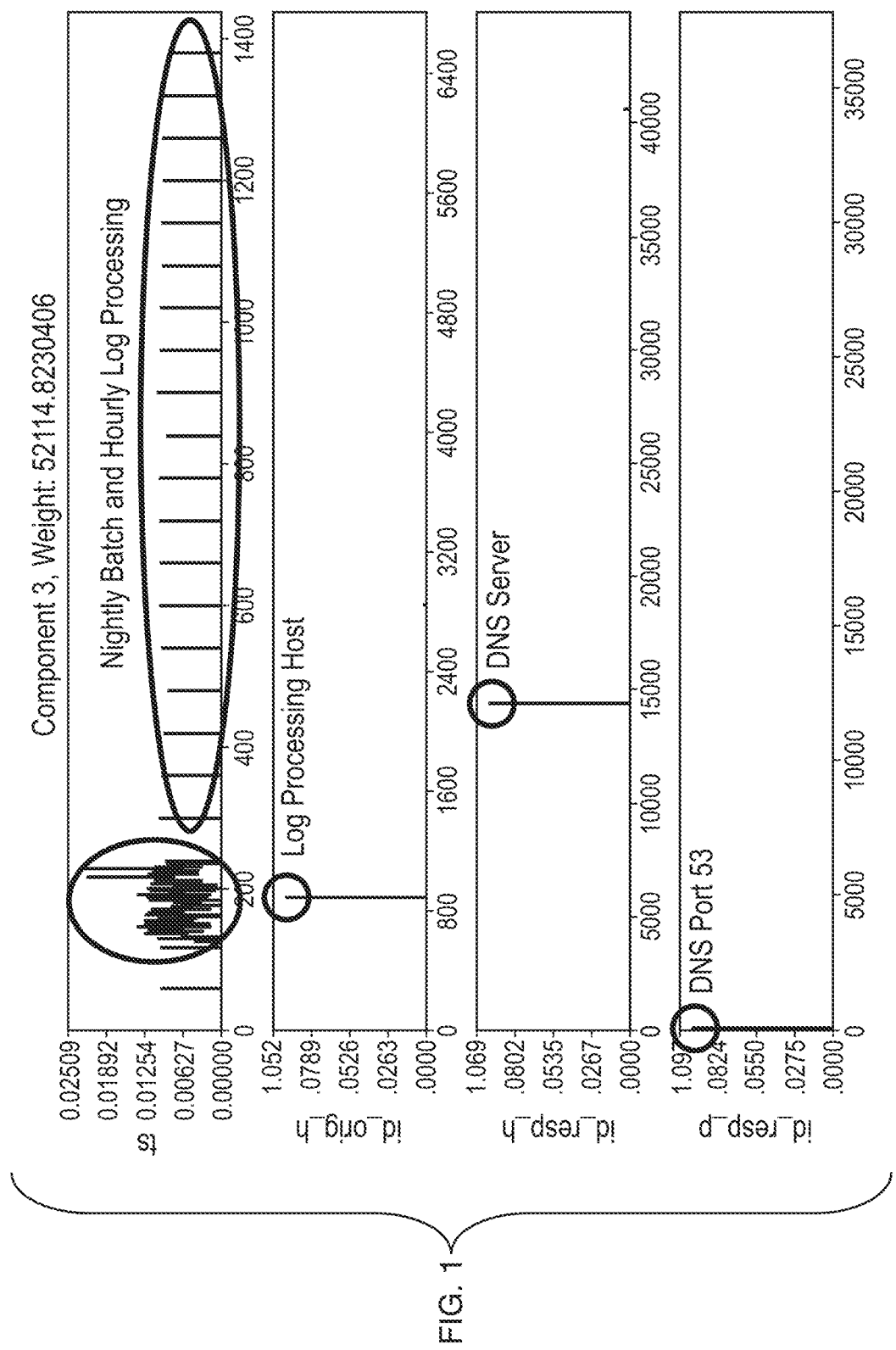
FIG. 1 shows an example component obtained from a decomposition of a network traffic tensor.

Tensors (or multidimensional arrays) are a natural fit for representing data with multiple associated attributes (e.g., network traffic logs). Consider a hypothetical log of messages leaving a network. For each message, the log records when it was sent, which IP address sent the message, and which TCP/UDP port that IP address used. This dataset can be formed into a three-dimensional tensor (a data cube) with the dimensions (modes) time, IP, and port. For each (time, IP, port) tuple, the tensor contains the count of the number of messages sent at that time, by that IP, and on that port. Similarly, in the geospatial domain, a three-dimensional tensor can be formed from transportation data by capturing source and destination locations (as linearized grid coordinates) along with departure times.

Tensor decompositions are a valuable, mathematically sound set of tools for exploratory analysis of multi-dimensional data and for capturing underlying multidimensional relationships. Tensor decompositions separate input data into patterns called components. Each component represents a latent behavior within the dataset. This separation into components occurs without training or upfront specification of any expected patterns. Two commonly used tensor decomposition techniques include the CANDECOMP/PARAFAC (CP) decomposition and Tucker decomposition. Techniques for efficient tensor decomposition, manipulation, and/or for memory-efficient storage are described in Applicant's following co-pending or issued patent applications, each of which is incorporated herein by reference in its entirety: U.S. patent application Ser. No. 13/898,159, filed on May 20, 2013, entitled "Efficient and Scalable Computations with Sparse Tensors;" U.S. patent application Ser. No. 14/540,427, filed on Nov. 13, 2014, entitled "Systems and Methods for Parallelizing and Optimizing Sparse Tensor Computations," issued as U.S. Pat. No. 9,471,377; and U.S. patent application Ser. No. 15/375,620, filed on Dec. 12, 2016, entitled "Systems and Methods for Selective Expansive Recursive Tensor Analysis," published as U.S. Patent Application Publication No. 20170168991A1.

The tensor decomposition decomposes a tensor into a sum of a predefined number (usually denoted R) of component tensors. Each component includes a vector of scores for each dimension of the original data, with one score in the vector for each element of the dimension. A scalar weight (usually denoted $\lambda$) may be associated with each component. The weight captures the relative prominence of that component pattern in the original data. Entries within and across dimensions that score highly in a single component are correlated. Intuitively, a tuple comprised of a single high-scoring element from each dimension corresponds, up to a best-fit approximation, to a tuple in the original dataset. Groups of correlated entries in each component generally identify clusters, patterns, trends, or abnormal events in the data.

At a high level, the method of decomposition involves a constrained model-fitting procedure that proceeds by gradient descent. In each step, readily parallelizable matrix and vector operations calculate a refinement to the model. A fitness metric tracks progress and, at termination, gives a measure of the final quality of the data approximation. In practice, even coarse approximations almost always succeed in pulling out dominant patterns in the data. In some embodiments, particularly suitable for network traffic and geospatial datasets, we used a variant of CP decomposition, namely, CP Alternating Poisson Regression (CP-APR), that supports non-negativity constraints. This ensures that contributing scores are positive and are thus interpretable as activities in the original data.

Topic Modeling

Topic modeling is a technique originally developed to discover the latent structure in large collections of text documents. A topic modeling algorithm processes a representation of each document in a corpus and produces a topic model that captures clusters of similar words as topics. These topics can then be used to describe collections of related documents.

A large number of algorithms for topic modeling have been proposed. In some embodiments, we used the seminal Latent Dirichlet Allocation (LDA) algorithm. In LDA, a document is modeled as a vector where each entry represents the count of a particular word in the document. This is often referred to as a "bag-of-words" model. The algorithm produces a topic model with a pre-defined number of topics where each topic is a multinomial distribution over words in the original corpus. From this model the topic mixture of a previously unseen document can be inferred.

Illustrative Examples

We describe the decompositions of a tensor representing typical network traffic data and a tensor representing geospatial data. These decompositions are used in the discussion below to illustrate various features of the overall analysis technique. The network traffic tensor has four modes: timestamp, source IP, destination IP, and destination port. The mode sizes are, respectively, 1440, 6818, 44916, and 37849. Timestamps are binned by minute and one day of data is considered. Tensor values are a count of duplicate 4-tuples in the dataset after binning. A rank 100 CP-APR decomposition is performed on this tensor. One illustrative component, (Component 3) is shown in FIG. 1. Component 3 shows a pattern of regular DNS lookups that occur once an hour, along with a large batch of lookups early in the morning (top row). This pattern is associated with a log server (second row) connecting to a DNS server (third row) on port 53 (fourth row). The pattern represents predictable traffic that occurs every day, thus we would expect it to be represented as a topic when modeling components from many days of decompositions.

Figure 2:
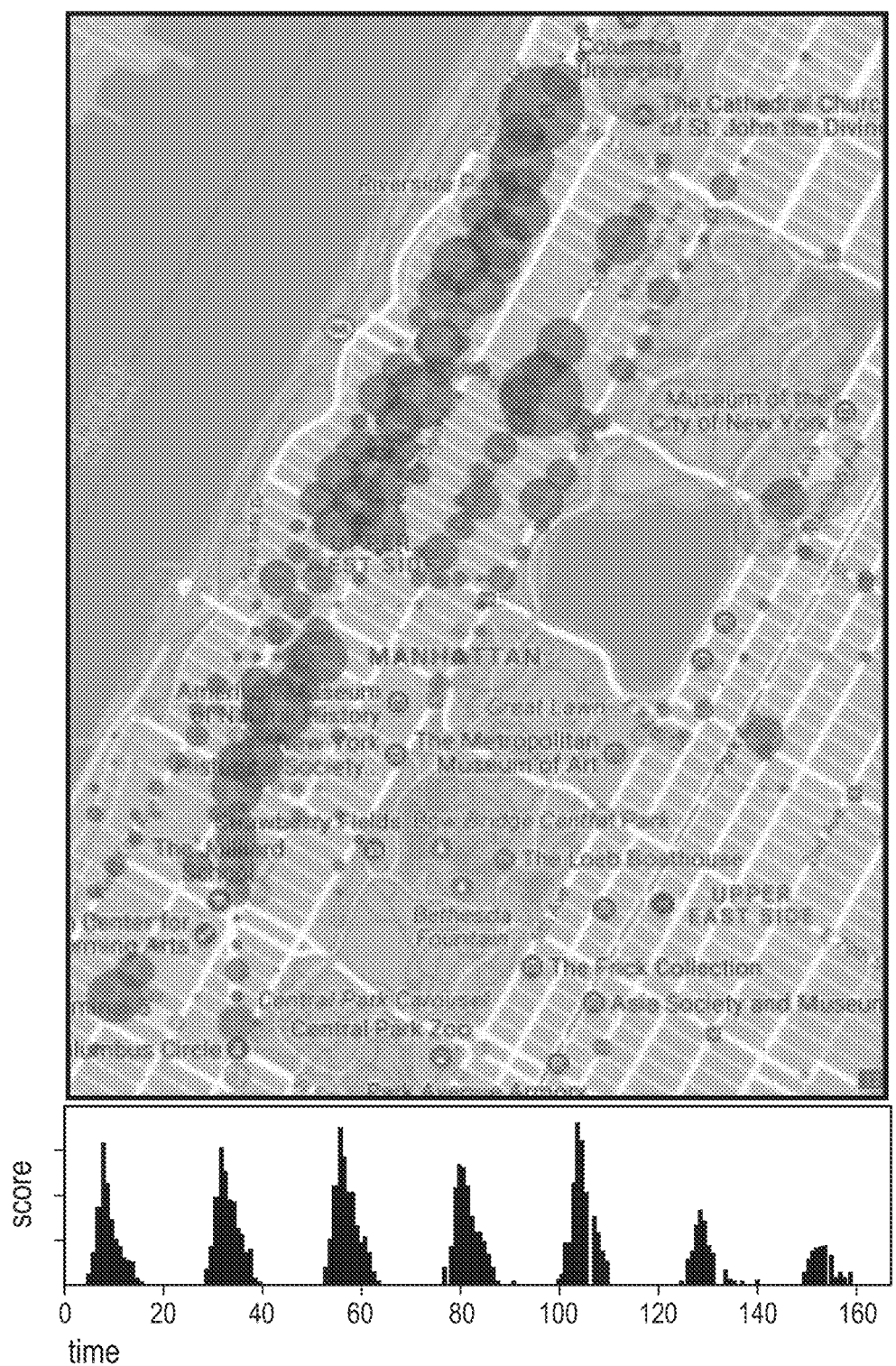
FIG. 2 shows an example component obtained from a decomposition of a geospatial tensor.

The geospatial tensor is taken from the New York City taxi dataset and has three modes: pickup timestamp, pickup location, and dropoff location. The mode sizes are, respectively, 168, 35033, and 76082. Timestamps are binned by hour and one week of data is considered. Locations are binned by rounding latitude and longitude values to three decimal places. Tensor values are a count of duplicate 3-tuples in the dataset after binning. A rank 100 CP-APR decomposition is performed on this tensor. Component 31, shown in FIG. 2, illustrates a pattern of taxi pickups (purple circles) and dropoffs (teal circles) primarily occurring on the Upper West Side of Manhattan. The timestamp mode shows the pattern to be strongly associated with weekday traffic as evidenced by the first five groups of nonzero scores in the plot of the timestamp scores. The weight of Component 31 is 32132.73. Point radii of the circles at the pickup and drop-off locations are proportional to score in archetype/decomposition. Bar chart is plot of scores in time mode with Monday 00:00 at the leftmost position and continuing sequentially by hour to Sunday 23:00 at the rightmost.

Component-Document Mapping

The first step in connecting tensor decompositions to topic modeling is representing tensor components as documents. We consider a rank R decomposition of an order-N tensor. The order of a tensor is the number of dimensions or modes of the tensor. Further consider an arbitrary component r from the decomposition with weight $w_r$ and score vectors $a_0$, $a_1, \ldots a_{N-1}$, with lengths $I_1, I_2, \ldots I_{N-1}$. We use a transform (also called a mapping) where the mode-specific score vectors of the r-th component are concatenated into a single vector to represent a bag-of-words encoded document of length $L=I_1+I_2+ \ldots +I_{N-1}$. Each index i of the concatenated vector represents a "word" and the score $s_i$ at each index i is transformed to represent an integer word count $c_i$.

In the foregoing network traffic example, we concatenate the four score vectors of Component 3 (shown in FIG. 1) into a single vector with L=91023. Every score $s_i$ 202 in the vector is multiplied by the weight of Component 3, i.e., $w_3$=52114.82 and the weighted score is truncated. The truncated score vector represents a document corresponding to Component 3. Documents are similarly produced for all other components of the network traffic tensor. In the foregoing geospatial example, we similarly concatenate three score vectors of Component 31 (shown in FIG. 2) into a single vector with L=111283 and multiply each score by the weight of Component 31, i.e., $w_{31}$=32132.73, to construct a document corresponding to Component 31. Documents are similarly produced for all other components of the geospatial tensor.

In general, the transformation of score $s_i$, where $0 \leq s_i \leq 1$, to a nonnegative integer word count $c_i$ is performed by some function $t(s_i)$. In some embodiments, we scale $s_i$ by the component weight $w_r$ and truncate, giving $c_i = \lfloor w_r s_i \rfloor$. This approach gives word counts that are roughly proportional to the number of records corresponding to the respective words that are present in the original dataset as represented by each component. In some other embodiments, we scale the scores by some constant k and truncate. This approach gives word counts that are roughly equivalent across all components.

In some embodiments, the tensor is decomposed not once but several times. Different decomposition techniques may be used across different decompositions. Some decompositions may automatically select the number of components ($R_j$, for the j-th decomposition) into which the tensor is decomposed. The respective values of $R_j$ may be specified to some decompositions. The number of components obtained from the different decompositions can be different. An important consideration when mapping components to documents is the semantic consistency of index values (also called mode labels) across decompositions. It is imperative that each index in each decomposition represents the same data value. For instance, in our running example of network traffic analysis, if the source IP of the log host is mapped to index 5, it must be mapped to index 5 in all components used for topic model training. Thus, the sequence of L labels, where $L=I_1+I_2+ \ldots +I_{N-1}$, that is associated with the respective score vectors corresponding to all of components is the same regardless of the technique used to generate the components and regardless of whether the components are generated from a single decomposition of the tensor or from several, e.g., 2, 8, 15, 50, or more decompositions.

Topic Model and Interpretation

In some embodiments, the natural language processing technique that is used to analyze the documents generated from the tensor components is topic modeling. To construct a topic model, we gather a collection of components for training the model. Since our goal is to automatically cluster and classify the results of a tensor decomposition, we train the model using components from multiple decompositions. In our running example of network traffic analysis, we trained the model using multiple decompositions each representing one day of network traffic. These different decompositions were performed on different tensors, where each tensor represented the data from a different day, to obtain the training dataset.

Given a collection of components represented as documents, we specify a certain number of topics T (e.g., 5, 8, 25, or more) and train an LDA model. In the trained model, each of the T topics is represented by a vector where each entry represents a probability p such that $\Sigma_{i=0}^{L-1} p_i = I_{N-1}$, where each topic is combination of one or more of the L words, where $L=I_1+I_2+ \ldots +I_{N-1}$. Recall that in a component obtained from tensor decomposition, the sum of normalized component scores in each mode is 1, as opposed to a sum across all L words (or labels) across all N modes as in a topic. We can, however, treat topics as archetype components by splitting the topic into N vectors corresponding to the N modes of the original tensor. We adjust the probabilities in each mode such that relative proportions between probabilities are the same as in the topic are the probabilities for each mode sum to 1. By converting topics into archetypes, we are able to compare them directly to components.

For the network traffic example, we trained a 100 topic LDA model with multiple decompositions representing data collected on different days from the same network. We expected to see an archetype similar to Component 3 (as shown in FIG. 1) because of the predictable and consistent pattern-of-activity represented by the component. The topic model produced the archetype shown in FIG. 3. This archetype, derived from a single topic in an LDA model, matched our expectations and is a generalized version of Component 3.

Figure 3:
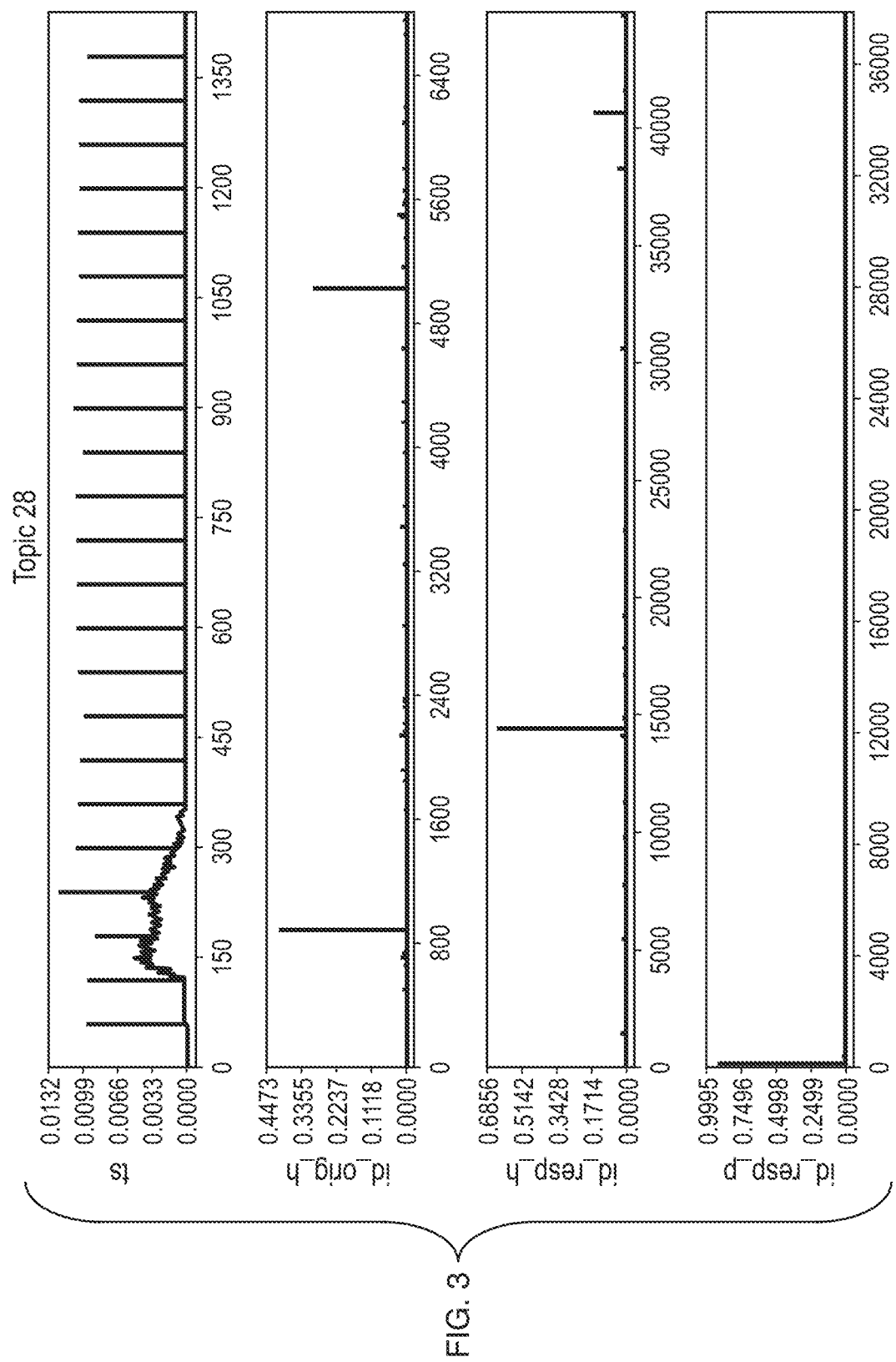
FIG. 3 depicts an example of a network traffic archetype, according to one embodiment.

For the geospatial example, we trained a 100 topic LDA model with multiple decompositions representing previous weeks of data taken from the taxi dataset. An archetype similar to Component 31 (as shown in FIG. 2) was produced by the topic model and is shown in FIG. 3. This archetype shows largely identical pickup locations, dropoff locations, and timestamps as Component 31 with small variations in the relative magnitude of scores/probabilities.

Inference, Clustering, and Classification

Figure 4:
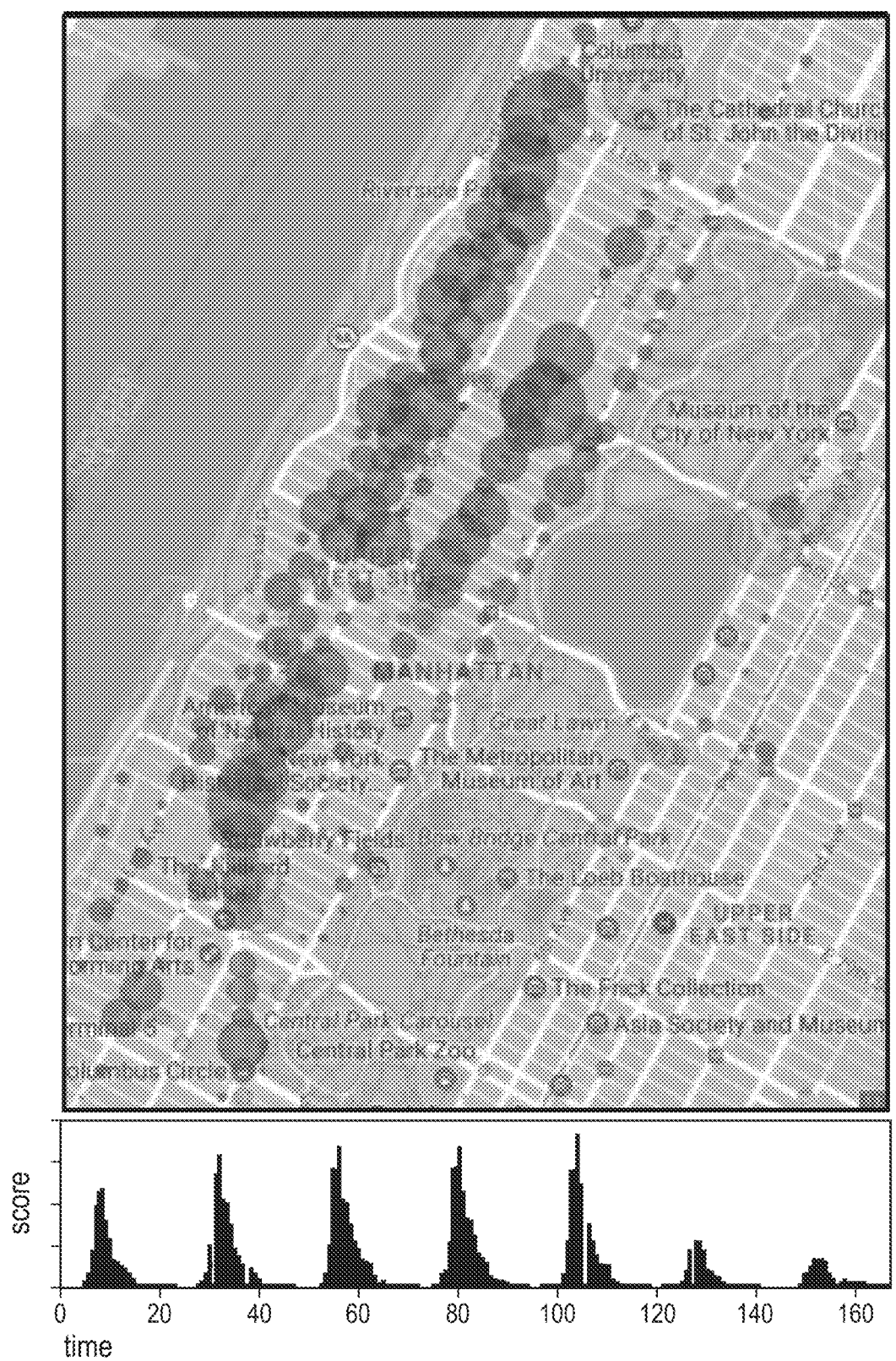
FIG. 4 depicts an example of a geospatial archetype, according to one embodiment.

We would like to automatically match previously unseen components, such as Component 3 in FIG. 1, to known behavior, for example the archetype shown in FIG. 4. LDA provides inference, which is a capability that makes this automatic matching possible. After inference, previously unseen components can be clustered around known patterns-of-activity as represented by topics. These topics may optionally be labeled, thus enabling classification along with clustering.

First, via LDA, we infer the topic mixture of one or more components. A topic mixture tells us which topics each component most resembles, and the relative magnitude of the resemblance. Inference also has the effect of projecting a high-dimensional component into a lower dimensional topic space. In our running example, inference projects a 93,000+ dimension component into a 100-dimensional topic space. Inference on Component 3 led to a mixture that was over 99% Topic 28.

After inference, we may use traditional clustering algorithms (e.g., k-means, agglomerative hierarchical clustering) on the lower-dimensional topic space. In this work, we use a naive clustering algorithm that assigns components to a cluster corresponding to the topic with the highest proportion in the mixture. In our running example Component 3 would clearly be assigned to the Topic 28 cluster.

Finally, topics/archetypes can be manually examined and labeled. The number of topics to label tends to be substantially lower than the number of components used to train the model. In our running network traffic example, we trained a topic model with 30 days of rank 100 decompositions. The 3,000 components produced by these decompositions, if they were to be used in an operational environment, would have to be manually examined and labeled. Instead, a topic model with 100 topics was trained, and only the resulting 100 topics were labeled. Subsequent decompositions can then be clustered and meaningfully described in terms of those 100 labeled topics. Further, since inference on documents used to train an LDA model produces meaningful results, the original 3,000 components can also be clustered and classified based on the topic model they were used to train.

Big Data Considerations

When adapting our approach to Big Data, the scale of both the data and the algorithms used must be considered. Big datasets can exceed trillion-scale while current tensor decomposition algorithms are limited to billion-scale datasets. Clearly, big datasets must be partitioned into (at most) billion-scale chunks and decomposed. Cybersecurity and geospatial intelligence applications are focused on identifying patterns-of-activity. Therefore, these datasets may be partitioned into manageable chunks representing a fixed time period, such as a few hours, a day, a week, etc.

Tensor decomposition substantially reduces the scale of data used in topic modeling. For example, a decomposition of a one billion entry tensor with R=104 (number of "documents") and L=107 (number of "words") yields a corpus and a vocabulary that are relatively small with respect to the capabilities of modern LDA implementations, which are capable of processing over 107 documents with vocabularies of over 109 words on a commodity shared memory system.

Overall Process for Extraction of Latent Information

Figure 5:
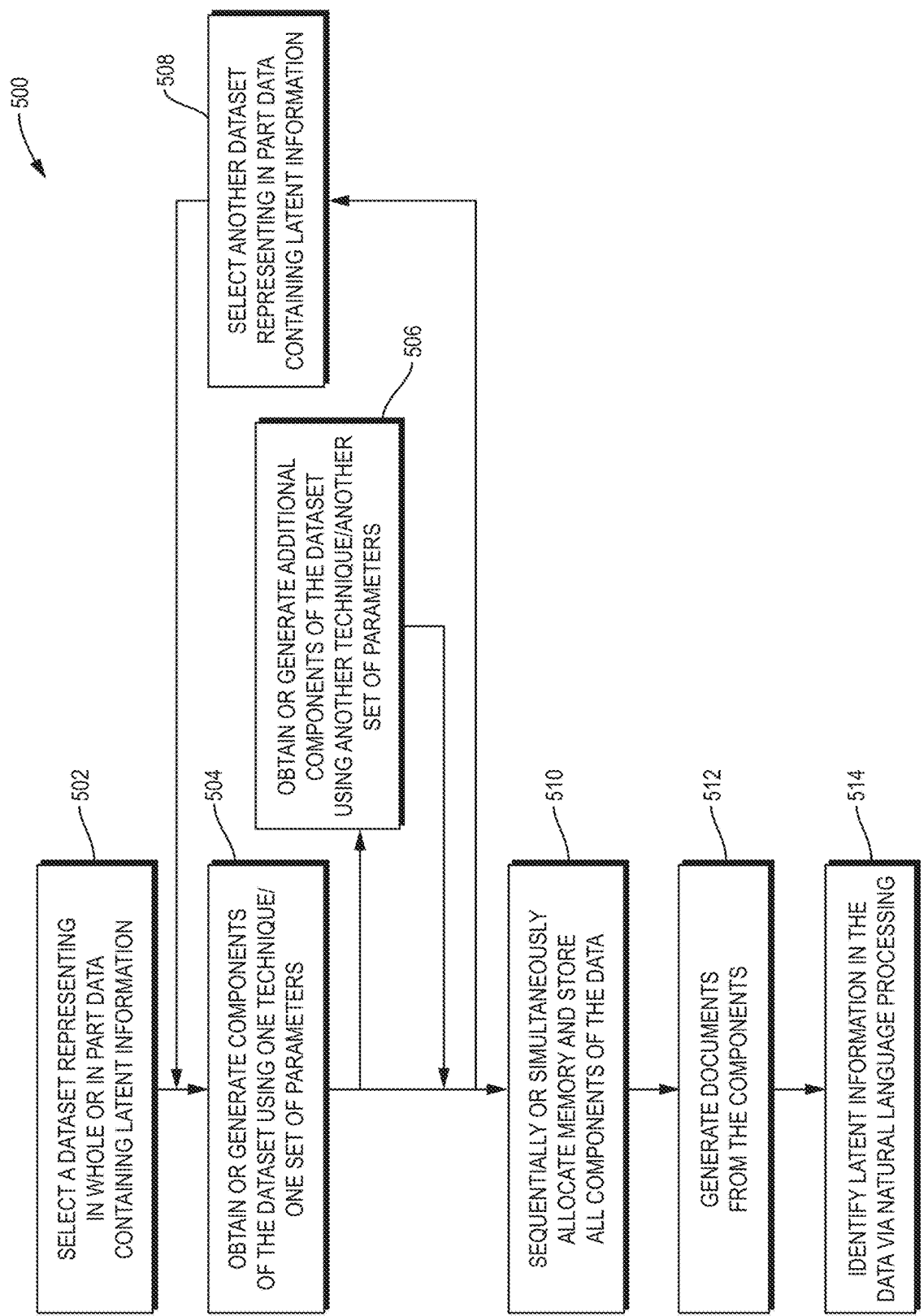
FIG. 5 shows an overall process for extracting latent information from data, according to various embodiments.

With reference to FIG. 5, in process 500 latent information contained in available data is extracted. The data may be available in the form of data structures such as vectors, matrices, or tensors, and may include sensor data, image and/or audio data, radar data, network traffic data, vehicular traffic data, atmospheric data, experimental data measured using measurement devices or collected by humans, data representing human interaction on social media networks, data generated from simulations, etc. Such data may be available in a single dataset, such as a tensor, or may be distributed across several datasets, such as several tensors, several images, several audio/video streams, etc.

In step 502 a first dataset, which may represent the entire data to be analyzed or a part of such data, is accessed, and components of that dataset are obtained in step 504. Techniques such as principle component analysis (PCA), tensor decomposition, classification using an artificial neural network may be employed to obtain a set of components of the first dataset. In some cases, a different set of components of the same dataset are obtained in step 506. To this end, the same technique that was used in step 504 may be used but with different parameters, or a different technique may be used. Step 506 may be repeated any number of times (e.g., 1, 2, 8, 15, 100, or more times). Additionally or in the alternative, another dataset representing a part of the entire data to be analyzed may optionally be accessed in step 508, and components of the other dataset may be obtained in step 504 and in the optional step(s) 506. This optional subprocess of accessing other datasets and obtaining their components may be repeated any number of times (e.g., 1, 20, 1000, or more times).

A vector dataset representing, for example, an audio signal or a radar signal, and having M elements is typically indexed from 0 to (M−1) or from 1 to M. The index space of a vector dataset may thereof be described as [0, M−1] or [1,M]. M can be any number such as 1, 25, a few hundreds, a few thousands, hundreds of thousands, a few millions, a few, tens, or hundreds of billions, or more. A matrix dataset, representing images, for example, may have an index space $[1,P] \times [1,M]$, where P and M can be any numbers as described above. The index space of a N-mode tensor dataset, representing any multidimensional data in general, can be described as $[1,I_1] \times [1,I_2] \times \ldots \times [1,I_N]$. The number of modes N is greater than or equal to three, and can be any number such as 8, 50, 125, 2000, or more. The size of the k-th mode or dimension, denoted $I_k$ can be any number, such as M, as described above.

If a classifier, such as an artificial neural network, is used to obtain the components of the dataset, the classifier would classify the input dataset into L classes, and the resulting classification is a component of the input dataset. L can be any number such as 2, 5, 20, 150, 1000, or more, and the index space of the components would have L indices. A respective label is associated with each of the L indices. If the dataset is a tensor, tensor decomposition may be used to obtain R components of the tensor. R can be any number such as 15, 100, 1200, etc. Some tensor decomposition techniques automatically select the value of R, and the value of R may be specified for some decomposition techniques. The index space of the tensor components has L indices and a respective label is associated with each of the L indices. In this case, however, L can be described as $L = \Sigma_{k=0}^{N-1} I_k$ or as $L = \Sigma_{k=1}^{N} I_k$, where $I_k$ is the size of the k-th mode or dimension, as described above. Typically, the size of the index space of the components is smaller, e.g., 1/10, 1/50, 1/1000, etc., than the size of the index space of the dataset.

One or more labels from the index space of L indices/labels may be scaled, i.e., the labels may be compressed or expanded. If the dataset is a tensor, all the labels associated with one or more selected modes may be scaled. For example, if a particular mode indicates the time of the day in minutes and has indices in the range [1, 1440], the corresponding labels may be compressed, so that the compressed indices and the corresponding labels indicate hours of the day. The compressed indices can be in the range [1, 24]. Alternatively, the original indices/labels of that mode may be expanded to indicate the time of the day in seconds of the day. In this case, the expanded indices can be in the range [1, 86400]. If certain indices/labels are compressed, the scores in the components corresponding to those indices/labels are aggregated. If certain indices/labels are expanded, the scores in the components corresponding to those indices/labels are divided and distributed over the expanded indices/labels, i.e., the divided scores are assigned to the expanded indices/labels.

In step 510, memory is allocated for the components of the one or more datasets that are processed. In some cases, the components are simply received from another process or a processor, and memory is allocated to store these components. In other cases, the components are generated as part of the process 500, e.g., by decomposition, classification, etc. In such cases, the step 510 may be combined with the step 504 and/or the optional step 506, i.e., the memory allocation for the components is integrated with component generation.

While allocating memory for a component, memory may be allocated for each of the L indices/labels. In some cases, to minimize memory usage, memory may be allocated for only a subset of the L indices/labels, where at least one component has a non-zero score corresponding to at least one of the labels in the subset. In other words, if the score associated with one or more labels is zero in all components, memory may not be allocated for those label(s). A score is designated to be zero if the absolute score value is less than a specified threshold, such as less than 0.001, 0.5, 3.0 etc., or is less than a specified percentage of the maximum or average score, e.g., less than 0.5%, 1%, 10%, etc. In some cases, additional memory may be allocated for one or more metadata parameters related to the analytical process, such as classification or decomposition, that produced the components. Examples of metadata parameters include the time required to generate the components, a fit between the components and the dataset from which the components were derived, etc.

As described above, the index space of the components is usually smaller than the index space of the one or more datasets. Nevertheless, a large number of components (e.g., hundreds, thousands, hundreds of thousands, millions, or even more components) may be obtained or generated by the process 500. If adequate system memory is available to store all of the components simultaneously, memory equal to the size of a component times the number of components may be allocated, and all components may be stored simultaneously.

In some cases, however, the available system memory may not be adequate to store all the components simultaneously, or allocating a large chunk of memory needed to store all the components at the same time may cause a degradation in system performance. In such cases, memory may be allocated only for a subset of all of the components to be processed. Documents would be generated and stored from those components in step 512, by applying a suitable transform function. The memory allocated for the subset of components may then be released. Thereafter, memory may be allocated for a different subset of the components, and the steps of document generation and storage, and release of memory may be repeated. The sub-process described above may be iterated so that documents are obtained for all of the components. In some cases, rather than releasing the memory, the memory allocated in one iteration may simply be reallocated to components processed in another iteration.

Memory can be allocated for all of the components or for a subset of components as a single contiguous memory block or as two or more non-contiguous memory blocks. The size of the subset of the components may be selected based on, e.g., the size of a single component and the size of the available memory. The size of the available memory can be based on the physical capacity of the system memory or may be a parameter selected by the computing system to avoid the risk of performance degradation due to allocation of large chunks of memory.

Figure 6:
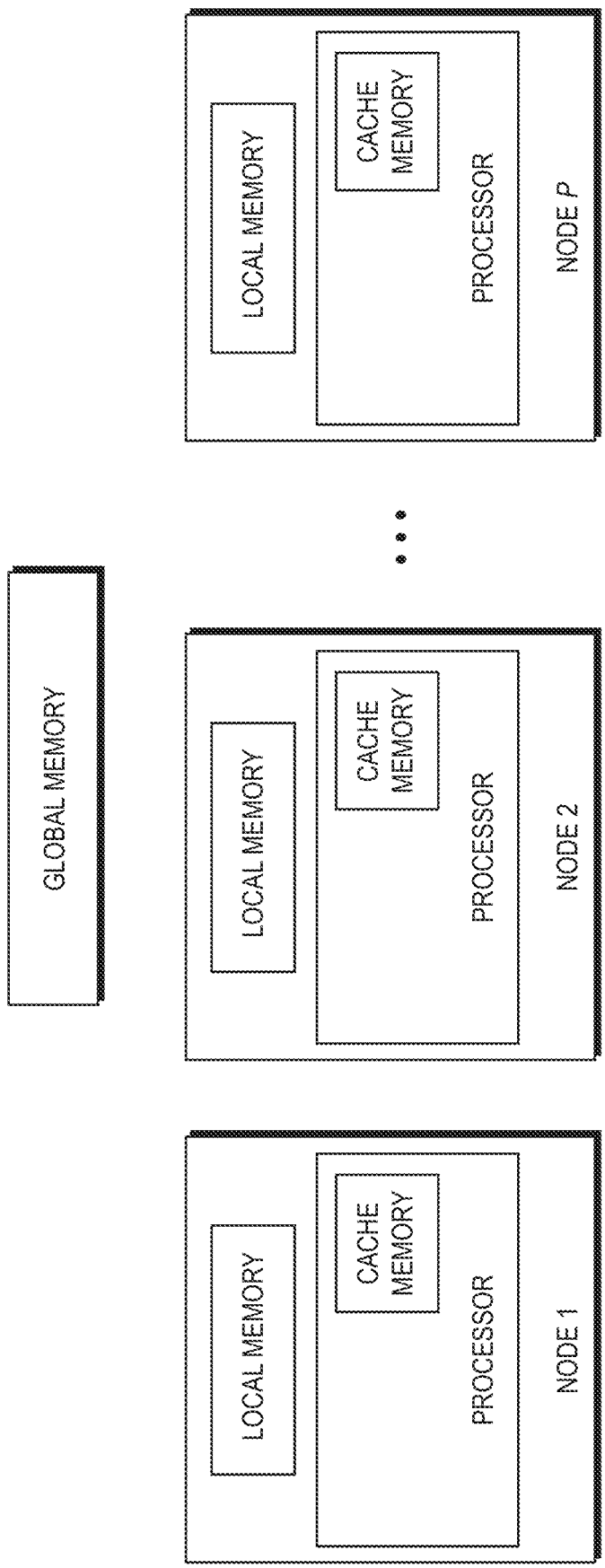
FIG. 6 shows a cluster computing environment having distributed memory for implementing various embodiments of the overall process depicted in FIG. 5.

In some cases, the steps of obtaining or generating components and/or generating documents from the components are distributed across several processors in a processing cluster, such as that shown in FIG. 6, so that the performance of the process 500 can be improved via parallelization. With reference to FIG. 6, each of these processors may include a local cache memory and is associated with a local memory. The sizes of two or more local memories associated with two or more processors can be different. The processing cluster may also include a global memory. The local memories of one or more processors may be accessible for reading and/or writing to one or more other processors, providing a shared memory system.

If a computing cluster is used, the allocation of memory for the components involves allocating different memory blocks in different local memories of one or more processors. The size of a contiguous block (or the total size of non-contiguous blocks) allocated within a particular local memory may be the same for all local memories or can depend on the size of that particular local memory.

Referring again to FIG. 5, after the components are transformed into documents in step 512, as described above, the documents are analyzed in step 514 using natural language processing (NLP). The NLP technique used is configured to produce an output in terms of the labels associated with the index space of the components. As such, the NLP may reveal information that is contained in the analyzed data, but is latent. The output may also be produced in terms of the metadata parameters associated with the analytical process of generating components of the data to be analyzed. The selected NLP technique may be executed by a specialized processor. Examples of NLP include topic modeling techniques such as Latent Dirichlet Allocation (LDA), Hierarchical Dirichlet Process (HDP), Dynamic Topic Model (DTM), and Hierarchical LDA (HLDA).

Experimental Evaluation

Experiments were conducted using the CP-APR decomposition included in the ENSIGN tensor decomposition package and the LDA implementation provided by the Gensim™ topic modeling package. Network data was collected over a period of three months on a small office network using the R-Scope™ implementation of the Bro network monitoring tool. The geospatial data used was New York City yellow cab trip report data from May through July of 2015. All decompositions were performed using default parameters. All LDA models were trained for 100 topics using 100 LDA iterations and 10 passes over the corpus. All other LDA parameters were left at default values.

Network Traffic Analysis

Figure 7A:
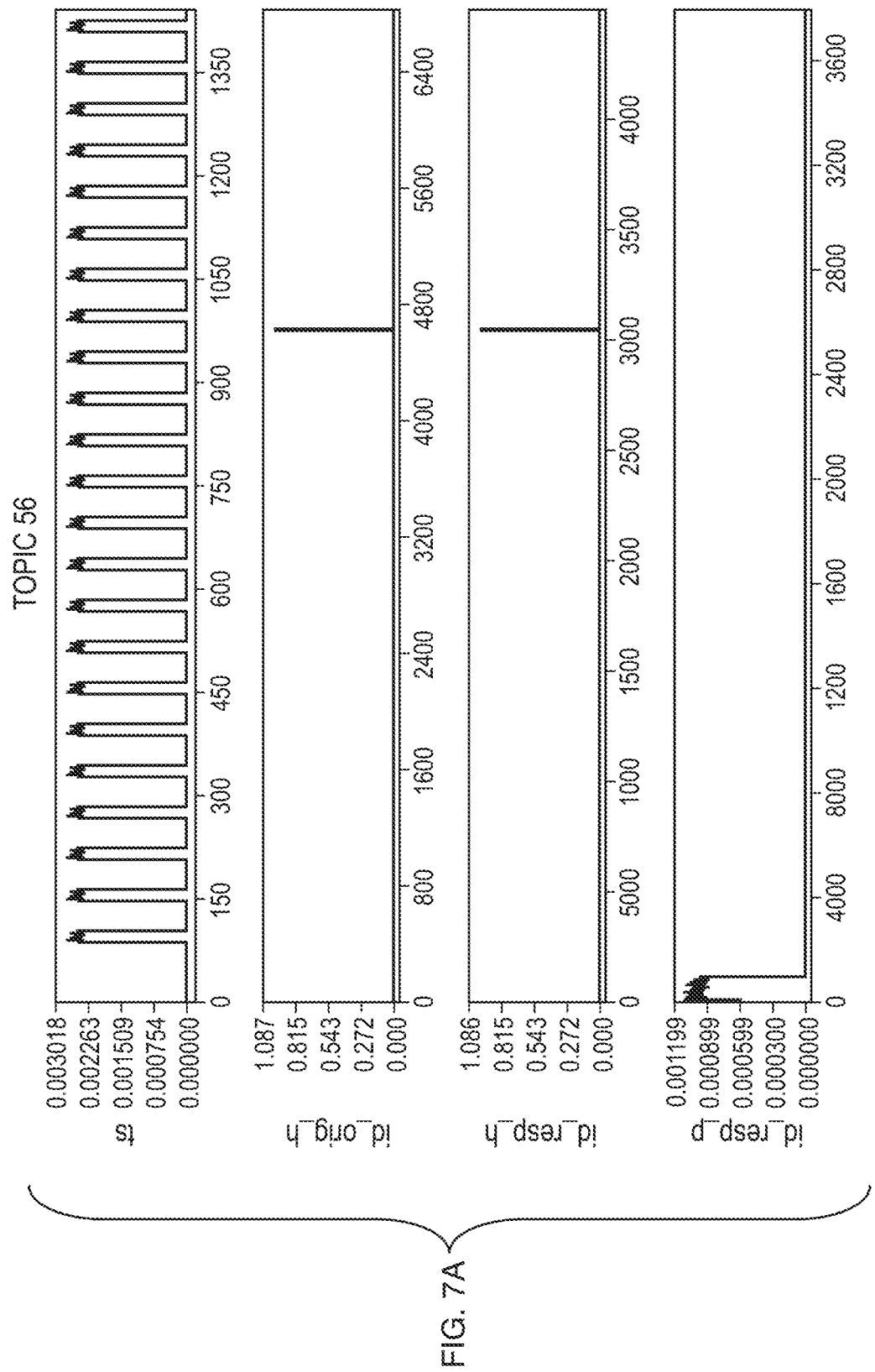
FIG. 7A depicts a topic archetype derived using an embodiment of the process shown in FIG. 5.
Figure 7B:
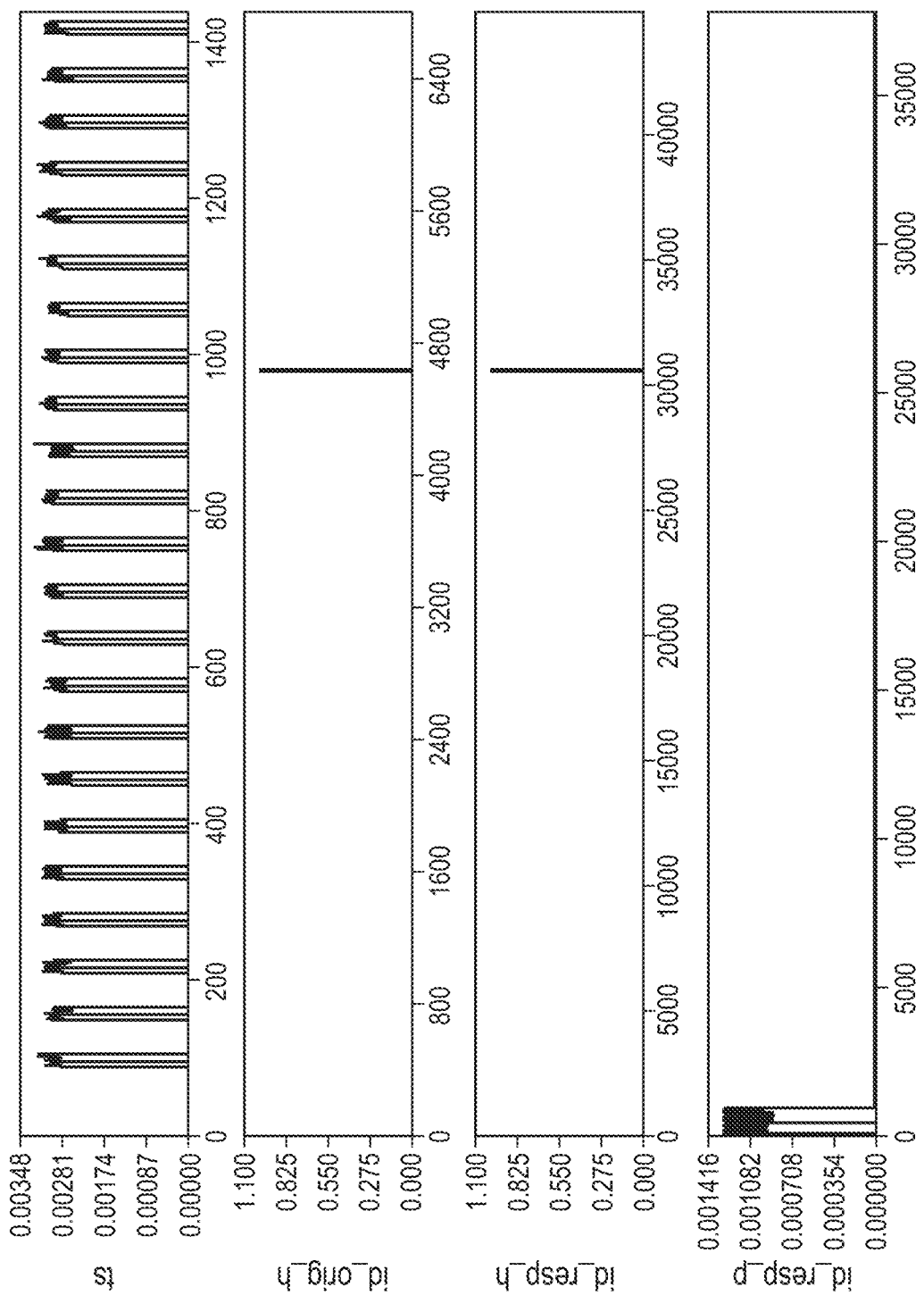
Figure 7D:
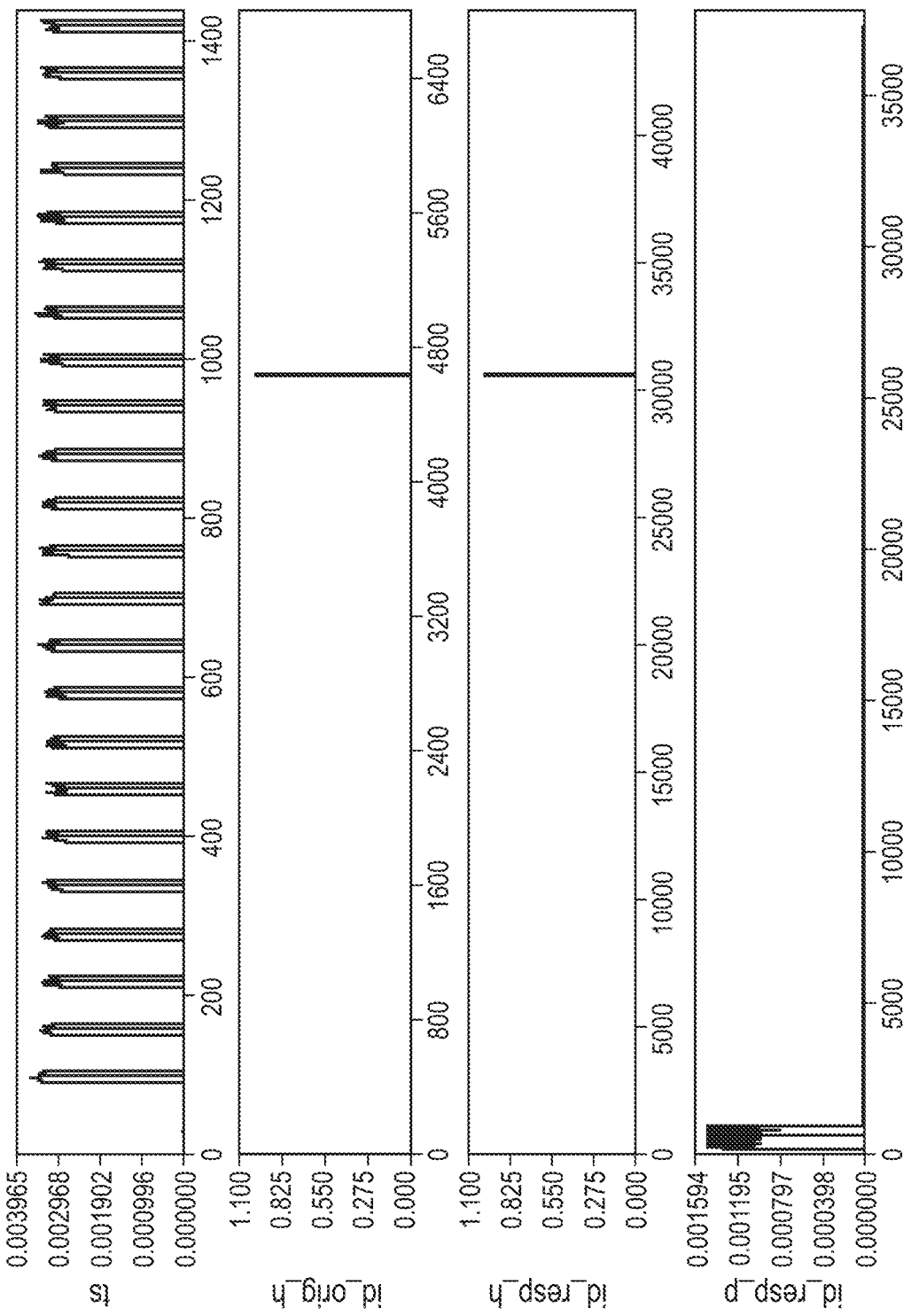

Network traffic tensors were constructed in the manner described above in the discussion of the network traffic running example. Rank 100 CP-APR decompositions were performed on 56 tensors, with each tensor representing one day of traffic. LDA models were trained using 42 days of decompositions and evaluated using the remaining 14 days. The training corpus included 4,200 documents with a vocabulary of 91,023 words. FIGS. 7A-7D illustrate members of a cluster with Topic 56 making up more than 97% of the inferred mixture. This cluster represents an intentionally seeded port scan where one source IP connects to ports 1-1024 of one destination IP once per hour. The archetype of Topic 56 is nearly identical to actual decomposition components from the test data. In particular, the topic archetype is shown in FIG. 7A, where the Y-axis shows the archetype probabilities. Representative components where Topic 56 forms at least 98% of the topic mixture are shown in FIGS. 7B, 7C, and 7D. Each chart in FIGS. 7B-7D plots the decomposition score vectors of, from top to bottom, the timestamp, source IP, destination IP, and destination port modes.

Figure 8A:
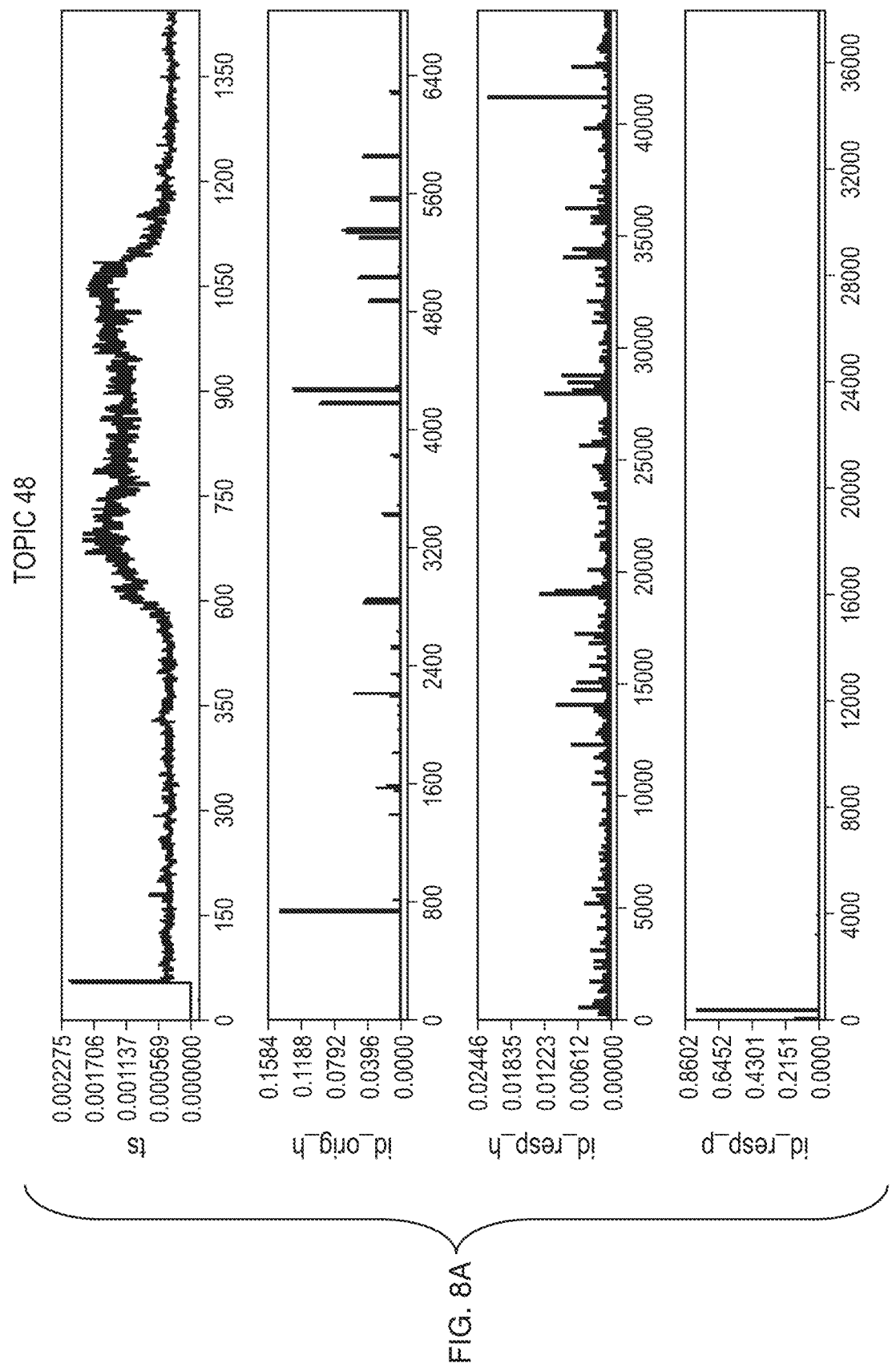
FIG. 8A depicts another topic archetype derived using an embodiment of the process shown in FIG. 5.
Figure 8B:
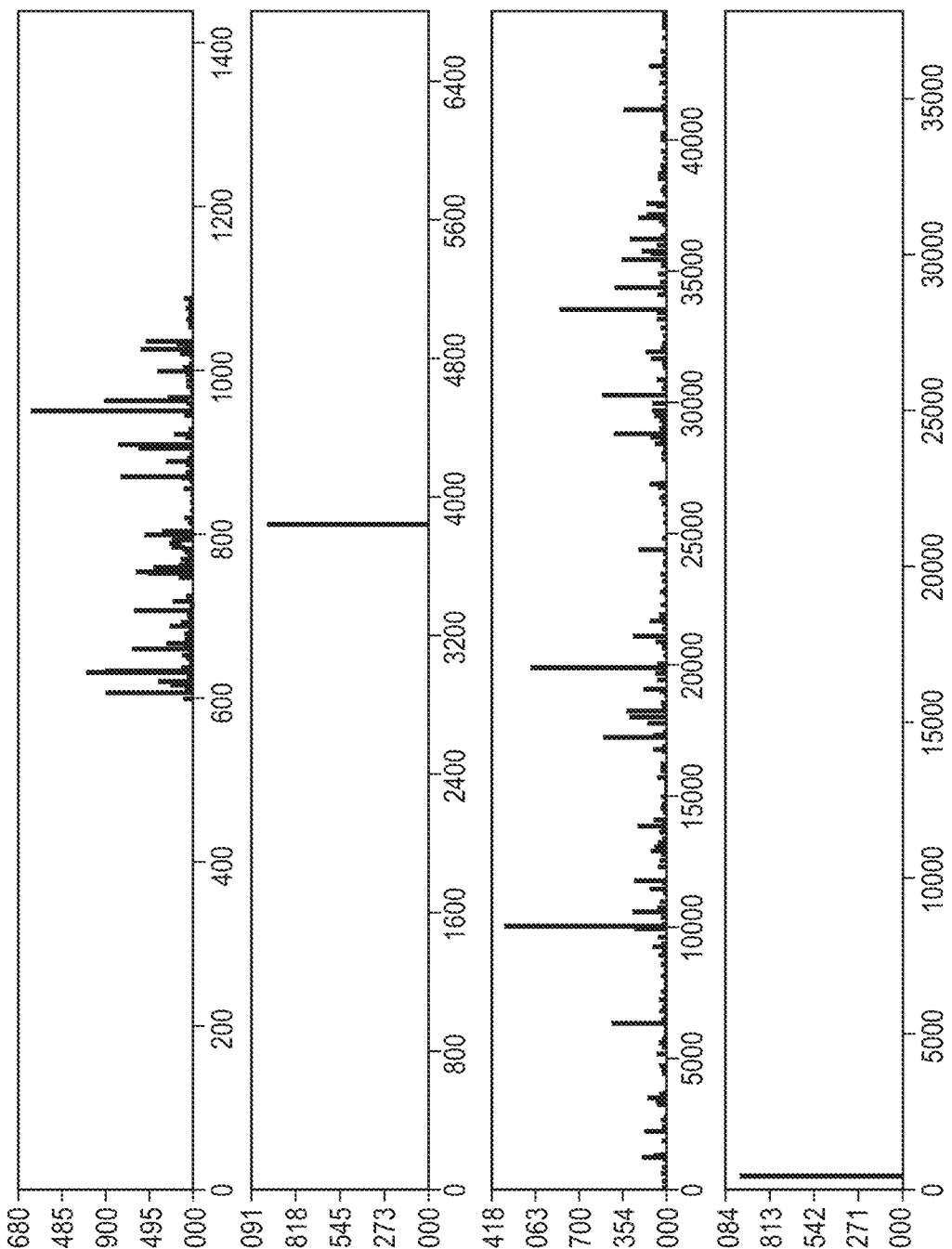
FIGS. 8B-8D depict data components that correspond to the archetype shown in FIG. 8A.
Figure 8C:
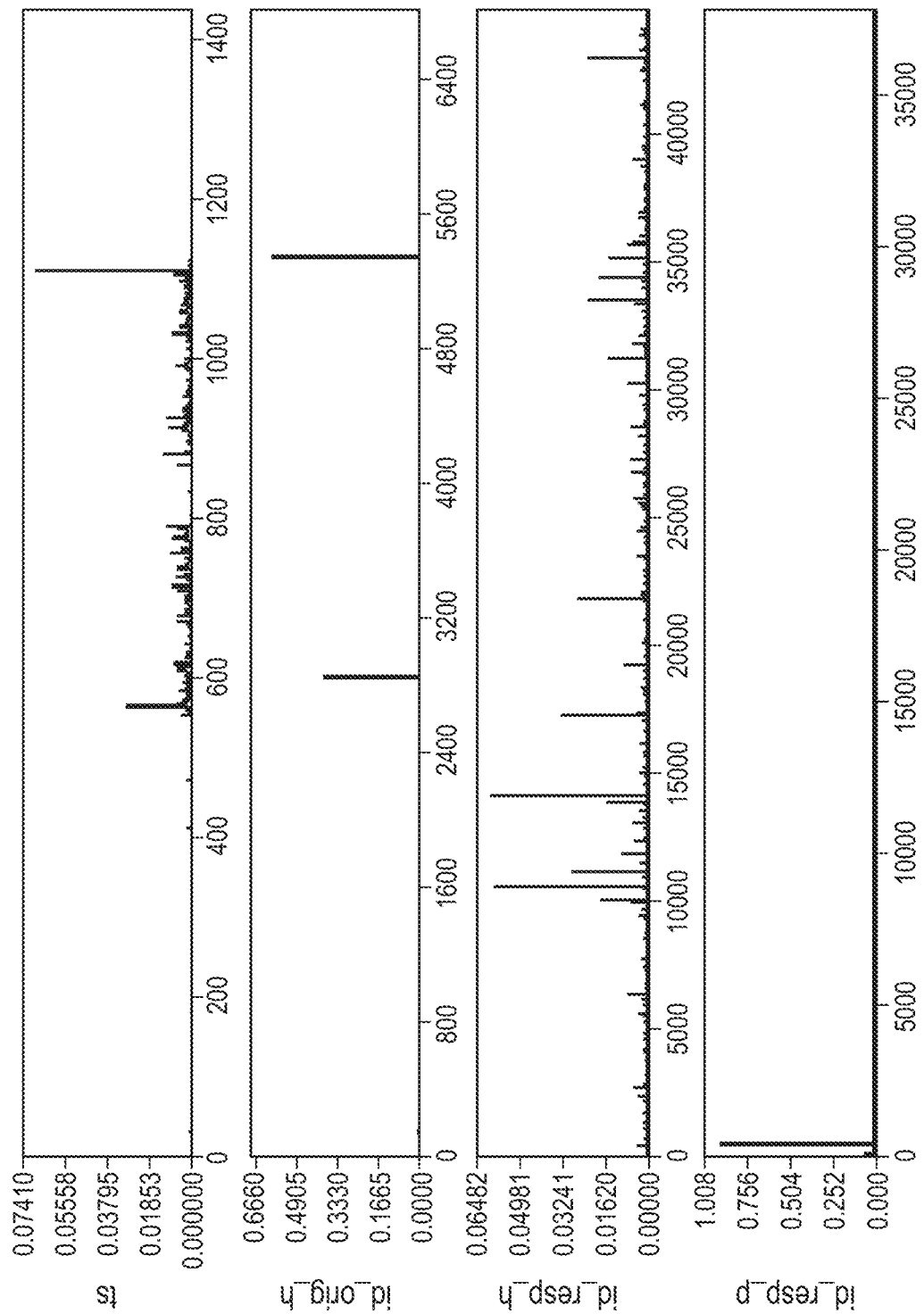
Figure 8D:
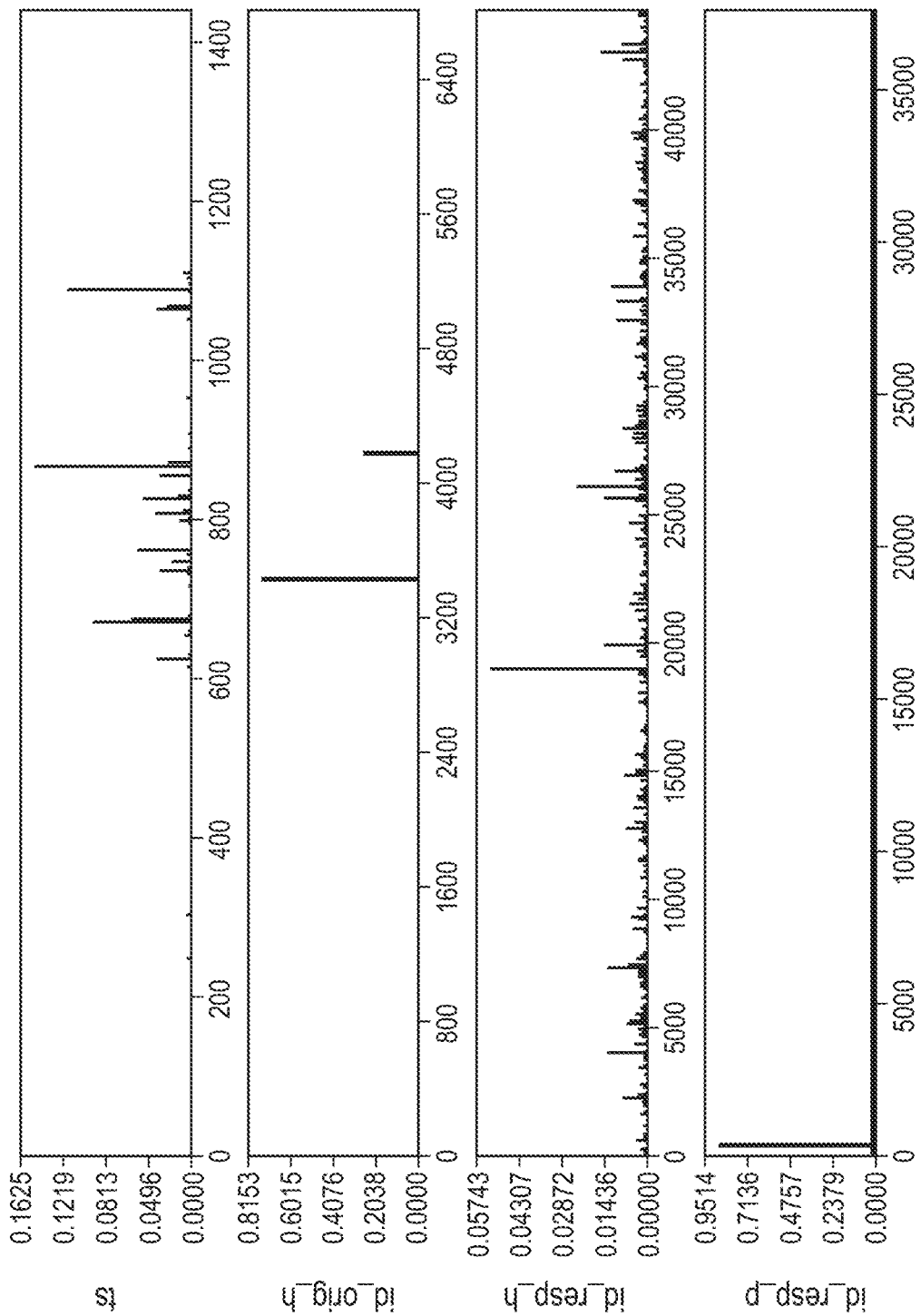

FIGS. 8A-8D show another cluster where the dominant Topic 48 made up greater than 98% of the inferred mixture. This cluster represents business hours internet traffic from employee computers. The archetype depicted in FIG. 8A shows a sustained burst of high scores during business hours with traffic originating from multiple IP addresses destined for a large number of other IP addresses. This traffic is primarily to port 443 (encrypted websites) with a smaller amount to port 80 (unencrypted websites). Representative components where Topic 48 forms at least 90% of mixture are shown in FIGS. 8B, 8C, and 8D.

FIGS. 8A-8D illustrate the ability of inference to and clustering to identify components that are generalized by a topic. The components shown in FIGS. 8B-8D do not match the archetype exactly. In all cases the components emphasize different times during business hours and highly score only a subset of the machines seen in the archetype. Despite these differences, it is reasonable to assign all components to the topic 48 cluster and further, it is reasonable to label this cluster "Business hours internet traffic."

Figure 9A:
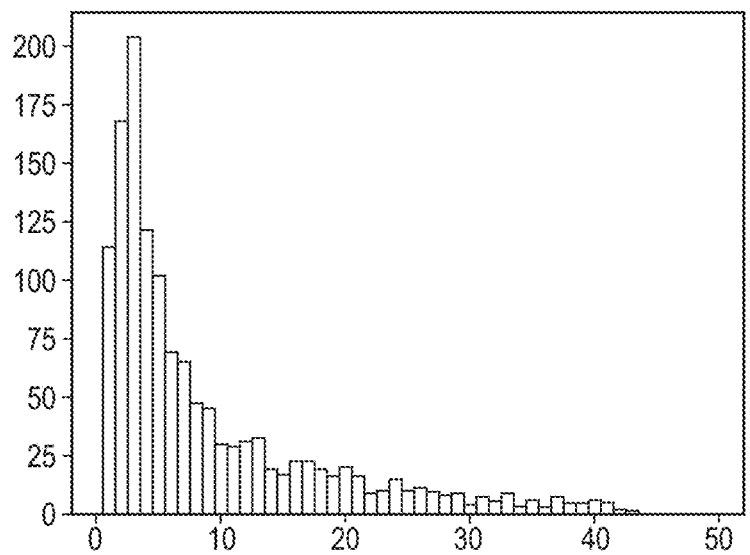
FIG. 9A is a histogram of nonzero topics per component that is derived from network traffic topic mixture composition for all test components, where the topic mixture was obtained using an embodiment of the process shown in FIG. 5.
Figure 9B:
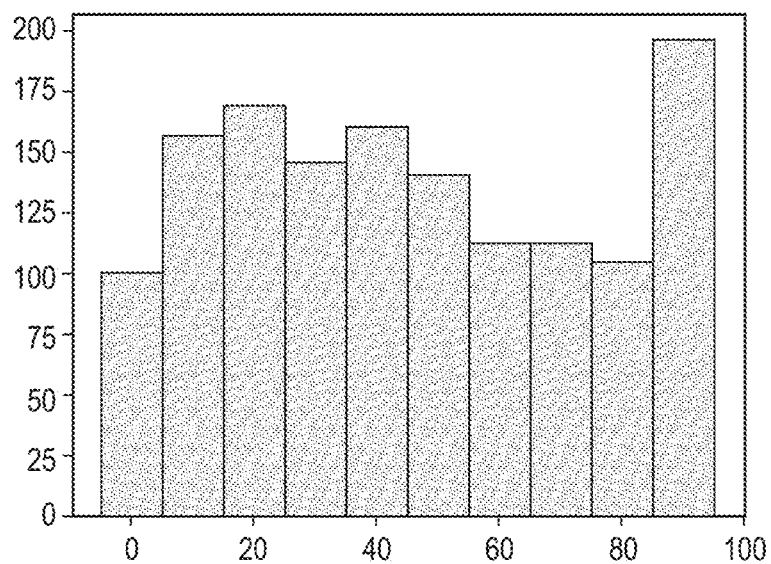
FIG. 9B is a histogram of mixture proportion (as a percentage) of a dominant topic selected from the topic mixture corresponding to FIG. 9A.

The histograms in FIGS. 9A and 9B provide insight into the composition of inferred topic mixtures for all test components. FIG. 9A shows that approximately half of topic mixtures include one to five nonzero topics. Components with lower topic counts were easier to interpret in terms of known behavior, whereas components with higher topic counts generally represented patterns-of-activity that had not been previously seen. Regardless of topic count, components with a single dominant topic were readily identifiable as specific instance of the dominant topic when it was as little as 60% of the mixture. FIG. 9B shows the distribution of the mixture proportion for the single largest topic, or primary topic, of each mixture. A large number of components have primary topics accounting for over 60% of the mixture. There are, however, a substantial number of mixtures with the primary topic below 60% representation. Taken together, both of these histograms indicate that the numbers of the two following types of topics may be maximized, to infer latent information: (1) topics that have a single topic representing a substantial proportion of the mixture (thus representing known patterns), or (2) topics that have a large number of topics with none that are particularly strong (thus representing anomalous patterns).

Analysis of Geospatial Data

Seven tensors were constructed from taxi data with each tensor representing one week of fares. Tensor modes were pickup timestamp, pickup location, and dropoff locations. Timestamps were binned by hour and locations were binned by rounding decimal latitude and longitude to three decimal places. Tensor values were a count of identical tuples in the dataset.

Rank 100 CP-APR decompositions were performed on each tensor. LDA models were trained using five weeks of decompositions from May and June and evaluated using the remaining two weeks from June and July. The training corpus was 500 documents with a vocabulary of 111,283 words.

Figure 10C:
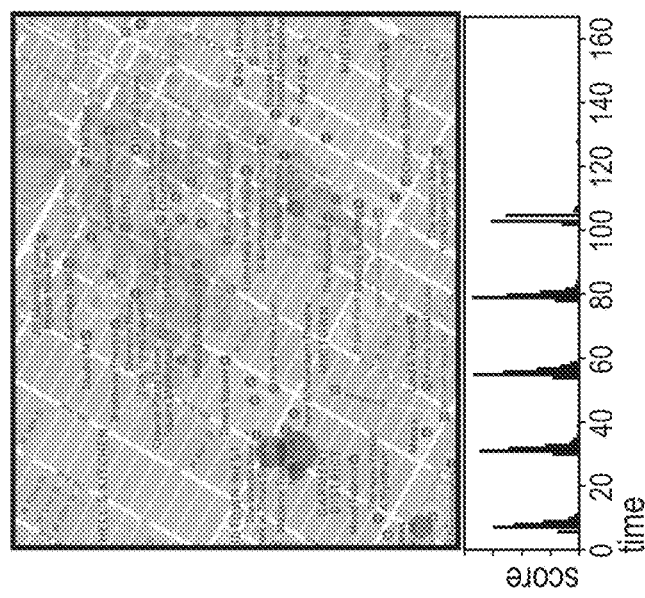
FIGS. 10B and 10C depict data components that correspond to the archetype shown in FIG. 10A.
Figure 10B:
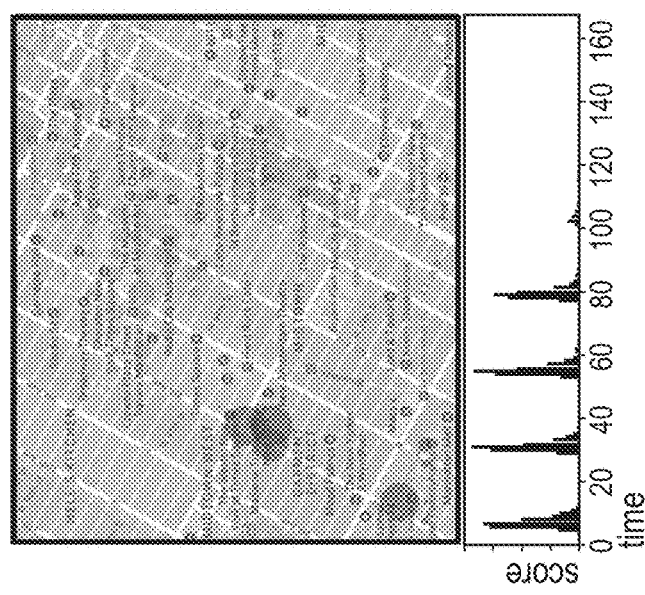
Figure 10A:
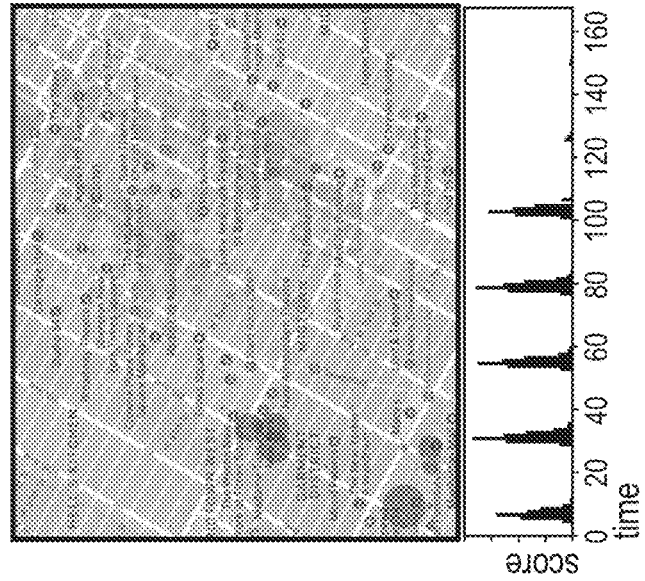
FIG. 10A depicts another topic archetype, corresponding to taxi traffic, that was derived using an embodiment of the process shown in FIG. 5.

Inference on test components consistently produced mixtures with reasonable clustering results. Clustering by largest topic proportion led to high-quality clusters when the topic proportion was over 90% of the mixture, as shown in FIGS. 10A-10C. These figures show weekday traffic from Penn Station and the Port Authority bus terminal to locations in Midtown Manhattan. A topic archetype is shown in FIG. 10A. Representative components with that topic forming over 90% of the topic mixture are shown in FIGS. 10B and 10C. In FIG. 10B we see a lower scores than expected on Friday. This is likely due to the fact that Friday, July 3 was a United States federal holiday leading to a reduced number of taxi fares to midtown employers. Otherwise, the time modes are clearly similar. The distribution of locations in the archetype is clearly similar to those in the two test components with only minor variations in score magnitude.

Figures 11A, 11B, 11C:
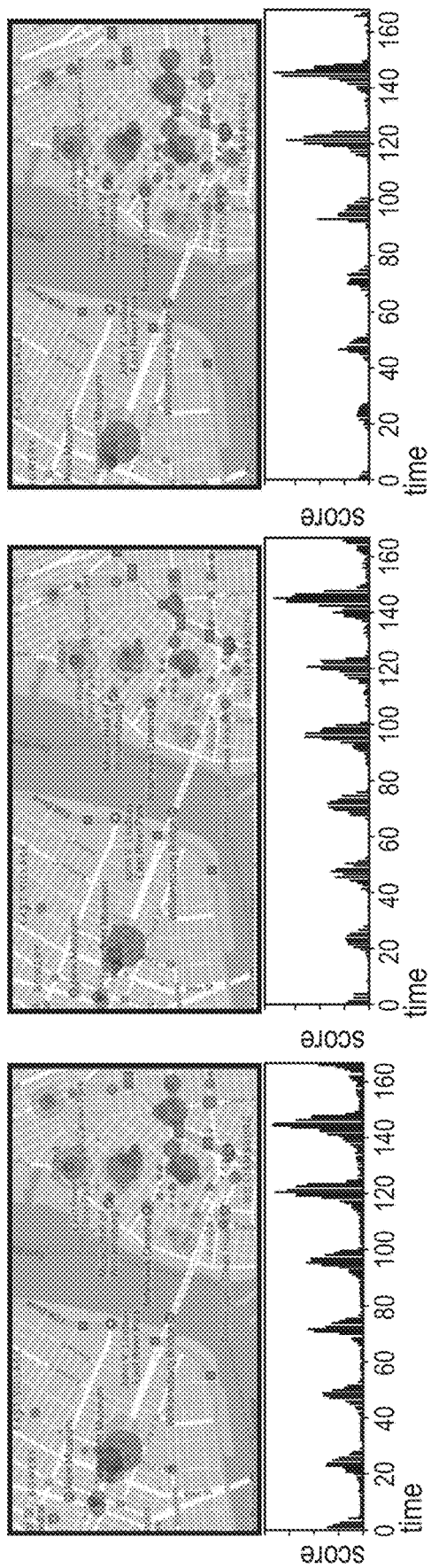
FIG. 11A depicts yet another topic archetype corresponding to taxi traffic, that was derived using an embodiment of the process shown in FIG. 5.
FIGS. 11B and 11C depict data components that correspond to the archetype shown in FIG. 11A.

FIGS. 11A-11C show another high-quality clustering of components representing traffic between the Lower East Side of Manhattan and Williamsburg, Brooklyn. A topic archetype is shown in FIG. 11A. Representative components with that topic forming over 90% of the topic mixture are shown in FIGS. 11B and 11C. Again, we see a reduction of time mode scores on the Friday. Otherwise, the same pattern of low scores on Monday through Thursday with higher scores on Friday and Saturday is evident. Again we see a similar distribution of locations with minor variations in score magnitude.

Figure 12A:
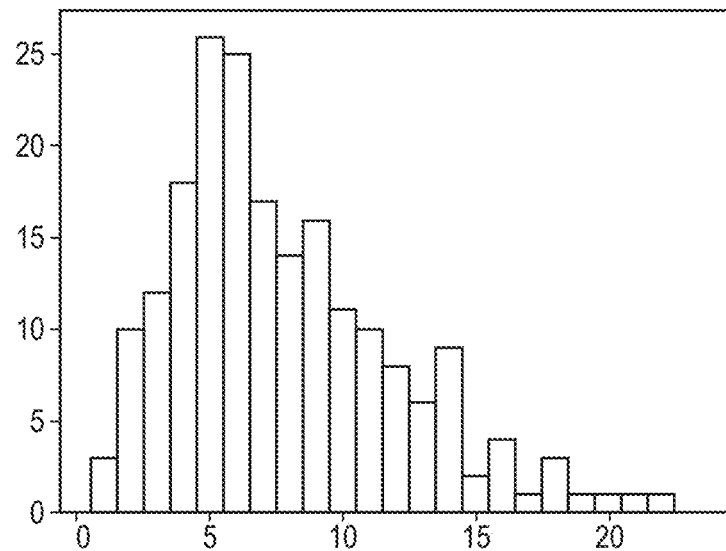
FIG. 12A is a histogram of nonzero topics per component that is derived from taxi traffic topic mixture composition for all test components, where the topic mixture was obtained using an embodiment of the process shown in FIG. 5.
Figure 12B:
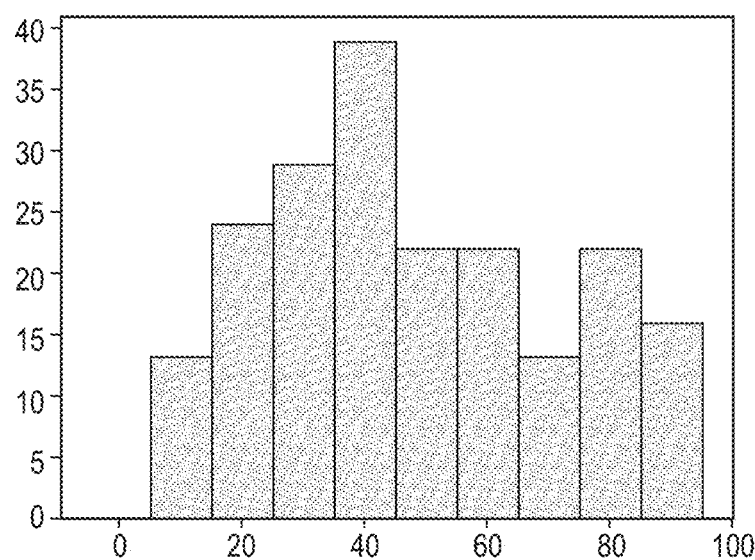
FIG. 12B is a histogram of mixture proportion (as a percentage) of a dominant topic selected from the topic mixture corresponding to FIG. 12A.

Topic mixture histograms for the taxi dataset, shown in FIGS. 12A and 12B, indicate that inferred mixtures generally include more topics with fewer dominant ones compared to the network traffic histograms in FIGS. 9A and 9B. This is partially explained by the major holiday falling towards the end of the week in the first test dataset. High topic count/anomalous components were found to represent behavior around the holiday, including increased traffic near popular fireworks viewing locations on the Fourth of July.

As evidenced by the cluster results discussed above, robust clusters of similar tensor decomposition components can be obtained by constructing a topic model and using a simple clustering strategy. The technique is resilient to overfitting of topics to components, as evidenced by components containing business internet traffic and holiday taxi traffic being sufficiently generalized by clearly defined topics. FIGS. 7A-7D, 8A-8D, 10A-10C, and 11A-11C all show components with single dominant topics in their inferred topic mixture, but this was not always the case.

Many components were described as mixtures of multiple topics with no clear dominant topic. In such cases, there were multiple reasonable interpretations of the components. When the component was a mixture of a small number of topics (2 to 4) with none clearly dominant, it could be interpreted as a combination of known patterns-of-activity. When the component was a mixture of a large number of topics with none clearly dominant, it was reasonable to interpret the component as representing anomalous behavior.

It was clear that the most useful components were either those that had a single dominant topic in the inferred mixture or those that were mixtures of a large number of weakly represented topics. In the first case, the components could be readily identified as representing known behavior; in the second case, the components were readily identified as representing anomalous behavior.

CONCLUSION

The use of natural language processing to accelerate classification of patterns isolated by artificial neural network based classification or by tensor decomposition methods enables unsupervised and automated analysis of high-volume high-dimensional data. The result is an effective method for clustering and classification of patterns-of-activity in high-dimensional datasets that sidesteps the "curse of dimensionality" issues encountered by traditional distance- and density-based approaches such as k-means clustering and DBSCAN. The approach enables the automation of workflows that go directly from data collection, through component generation, to identification of actionable insight.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for configuring memory of a computing system for extraction of latent information from data comprising a first dataset represented in a first index space, the method comprising:
obtaining a plurality of components comprising a set of components of the first dataset, wherein each component in the plurality of components comprises a plurality of scores associated with a second index space that is different from the first index space, wherein a respective label is associated with each index in the second index space;
associating with at least one component of the plurality of components a vector having a size at least equal to a total number of labels corresponding to non-zero scores in the at least one component, and allocating in the memory a block of memory for the vector;
for each component of the plurality of components, storing in the respective associated vector, scores corresponding to a plurality of labels associated with the second index space, wherein a common label sequence is used for storing the scores in each vector;
generating a plurality of documents, wherein each document corresponds to a respective component and is obtained by applying a transform function to the vector corresponding to that component; and
analyzing the plurality of documents using a processor adapted to perform natural language processing (NLP), wherein analysis from the NLP is expressed using one or more labels associated with the second index space, thereby describing latent information contained in the data.

2. The method of claim 1, wherein size of the second index space is less than size of the first index space.

3. The method of claim 1, wherein:
the data comprises a second dataset represented in the first index space; and
obtaining the plurality of components comprises obtaining a set of components of the second dataset.

4. The method of claim 1, wherein:
the plurality of components are obtained by classifying the first dataset into a number of classes; and
size of the second index space is equal to the number of classes.

5. The method of claim 4, wherein the classification is performed using a processor configured as an artificial neural network.

6. The method of claim 1, further comprising:
prior to the allocating step, scaling one or more labels in the second index space, thereby modifying the second index space, wherein the scaling comprises either compression or expansion of the one or more labels; and
if the scaling comprises compression, aggregating one or more scores corresponding to the one or more scaled labels or, otherwise, dividing the one or more scores over expanded labels.

7. The method of claim 1, wherein:
the first dataset comprises a first tensor having N modes, wherein N ≥3;
index range of the k-th mode is $I_k$, wherein $I_k \geq 1$;
size of the first index space is $\Pi_{k=0}^{N-1} I_k$; and
the labels are associated with indices of modes of the first tensor.

8. The method of claim 7, wherein:
the set of components of the first tensor is generated using one or more decompositions of the first tensor, at least one of the one or more decompositions comprising a CANDECOMP/PARAFAC (CP) decomposition or a Tucker decomposition; and
size of the second index space is $\Sigma_{k=0}^{N-1} I_k$.

9. The method of claim 8, wherein a total number of components that forms the set of components of the first tensor is either specified for at least one of the one or more decompositions or is selected automatically by at least one of the one or more decompositions.

10. The method of claim 7, wherein:
the set of components of the first tensor is generated using a plurality of tensor decompositions; and
each decomposition provides a subset of components in the set of components.

11. The method of claim 10, wherein a number of components provided in a first subset is different from a number of components provided in a second subset.

12. The method of claim 7, wherein obtaining the set of components of the first tensor comprises performing at least one of: (i) at least one CANDECOMP/PARAFAC (CP) decomposition of the first tensor, or (ii) at least one Tucker decomposition of the first tensor.

13. The method of claim 7, wherein:
the data comprises a second dataset comprising a second tensor having N modes; and
obtaining the plurality of components comprises obtaining a set of components of the second tensor that are generated using one or more decompositions of the second tensor, at least one of the one or more decompositions comprising a CP decomposition or a Tucker decomposition.

14. The method of claim 7, further comprising:
prior to the allocating step, scaling one or more labels associated with at least one mode, thereby modifying the second index space, wherein the scaling comprises either compression or expansion of the one or more labels; and
if the scaling comprises compression, aggregating one or more scores corresponding to the one or more scaled labels or, otherwise, dividing the one or more scores over expanded labels.

15. The method of claim 1, wherein:
each score in a first plurality of scores associated with a first component ranges from 0 to 1; and
the first component comprises a weight.

16. The method of claim 1, wherein allocating a first block of memory designated as a first vector corresponding to a first component comprises allocating a plurality of non-continuous sub-blocks of memory.

17. The method of claim 16, wherein a first sub-block of memory is accessed from memory associated with a first processor and a second sub-block of memory is accessed from memory associated with a second processor.

18. The method of claim 1, wherein allocating a first block of memory designated as a first vector corresponding to a first component further comprises allocating at least one memory location corresponding to a metadata parameter associated with the plurality of components.

19. The method of claim 18, wherein the topics are expressed using the metadata parameter.

20. The method of claim 1, wherein the transform function comprises, for each component of the plurality of components, multiplying each score in the vector corresponding to that component with a weight associated with that component.

21. The method of claim 1, wherein the transform function comprises, for each component of the plurality of components, multiplying each score in the vector corresponding to that component with a specified constant.

22. The method of claim 1, wherein:
the NLP comprises topic modeling; and
the processor adapted to perform the NLP is programmed to identify one or more topics from the plurality of documents and to express each topic in terms of a sequence of probabilities, wherein each probability corresponds to a respective label in the common label sequence.

23. The method of claim 22, wherein topic modeling comprises one or more of: Latent Dirichlet Allocation (LDA), Hierarchical Dirichlet Process (HDP), Dynamic Topic Model (DTM), and Hierarchical LDA (HLDA).

24. The method of claim 22, wherein the topic modeling comprises automatically determining a number of topics to be identified.

25. The method of claim 22, wherein the first dataset comprises a first tensor having N modes, wherein N ≥3, the method further comprising:
partitioning at least one topic as a set of archetype components, wherein each archetype component corresponds to a respective mode of the first tensor and comprises one or more probability values associated with one or more labels of the respective mode; and
for each archetype component, scaling each probability value such that sum of the probability values is equal to 1.0.

26. A system for configuring memory used for extraction of latent information from data comprising a first dataset represented in a first index space, the system comprising:
a first processor;
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
obtain a plurality of components comprising a set of components of the first dataset, wherein each component in the plurality of components comprises a plurality of scores associated with a second index space that is different from the first index space, wherein a respective label is associated with each index in the second index space;
associate with at least one component of the plurality of components a vector having a size at least equal to a total number of labels corresponding to non-zero scores in the at least one component, and allocate in the memory a block of memory for the vector;
store in the respective associated vector for each component of the plurality of components, scores corresponding to a plurality of labels associated with the second index space, wherein a common label sequence is used for storing the scores in each vector; and
generate a plurality of documents, wherein each document corresponds to a respective component and is obtained by applying a transform function to the vector corresponding to that component.

27. The system of claim 26, wherein size of the second index space is less than size of the first index space.

28. The system of claim 26, wherein:
the data comprises a second dataset represented in the first index space; and
to obtain the plurality of components, the instructions program the processing unit to obtain a set of components of the second dataset.

29. The system of claim 26, wherein:
the plurality of components are obtained by classifying the first dataset into a number of classes; and
size of the second index space is equal to the number of classes.

30. The system of claim 29, wherein:
the processing unit comprises an artificial neural network processor adapted to perform the classification; or
the instructions configure a part of the processing unit as an artificial neural network to perform the classification.

31. The system of claim 26, wherein the instructions program the processing unit to:
prior to performing the allocate operation, scale one or more labels in the second index space, thereby modifying the second index space, wherein the scaling comprises either compression or expansion of the one or more labels; and
if the scaling comprises compression, aggregate one or more scores corresponding to the one or more scaled labels or, otherwise, divide the one or more scores over expanded labels.

32. The system of claim 26, wherein:
the first dataset comprises a first tensor having N modes, wherein N ≥3;
index range of the k-th mode is $I_k$, wherein $I_k \geq 1$;
size of the first index space is $\Pi_{k=0}^{N-1} I_k$; and
the labels are associated with indices of modes of the first tensor.

33. The system of claim 32, wherein:
the set of components of the first tensor is generated using one or more decompositions of the first tensor, at least one of the one or more decompositions comprising a CANDECOMP/PARAFAC (CP) decomposition or a Tucker decomposition; and
size of the second index space is $\Sigma_{k=0}^{N-1} I_k$.

34. The system of claim 33, wherein a total number of components that forms the set of components of the first tensor is either specified for at least one of the one or more decompositions or is selected automatically by at least one of the one or more decompositions.

35. The system of claim 32, wherein:
the set of components of the first tensor is generated using a plurality of tensor decompositions; and
each decomposition provides a subset of components in the set of components.

36. The system of claim 35, wherein a number of components provided in a first subset is different from a number of components provided in a second subset.

37. The system of claim 32, wherein to obtain the set of components of the first tensor, the instructions program the processing unit to perform at least one of: (i) at least one CANDECOMP/PARAFAC (CP) decomposition of the first tensor, or (ii) at least one Tucker decomposition of the first tensor.

38. The system of claim 32, wherein:
the data comprises a second dataset comprising a second tensor having N modes; and
to obtain the plurality of components, the instructions program the processing unit to obtain a set of components of the second tensor that are generated using one or more decompositions of the second tensor, at least one of the one or more decompositions comprising a CP decomposition or a Tucker decomposition.

39. The system of claim 32, wherein the instructions program the processing unit to:
prior to performing the allocate operation, scale one or more labels associated with at least one mode, thereby modifying the second index space, wherein the scaling comprises either compression or expansion of the one or more labels; and
if the scaling comprises compression, aggregate one or more scores corresponding to the one or more scaled labels or, otherwise, divide the one or more scores over expanded labels.

40. The system of claim 26, wherein:
each score in a first plurality of scores associated with a first component ranges from 0 to 1; and
the first component comprises a weight.

41. The system of claim 26, wherein to allocate a first block of memory designated as a first vector corresponding to a first component, the instructions program the processing unit to allocate a plurality of non-continuous sub-blocks of memory in the memory module.

42. The system of claim 41, wherein:
the processing unit comprises a first node and a second node; and
a first sub-block of memory is accessed from memory associated with the first node and a second sub-block of memory is accessed from memory associated with the second node.

43. The system of claim 26, wherein to allocate a first block of memory designated as a first vector corresponding to a first component, the instructions program the processing unit to allocate further at least one memory location corresponding to a metadata parameter associated with the plurality of components.

44. The system of claim 43, wherein the topics are expressed using the metadata parameter.

45. The system of claim 26, wherein the transform function comprises, for each component of the plurality of components, multiplying each score in the vector corresponding to that component with a weight associated with that component.

46. The system of claim 26, wherein the transform function comprises, for each component of the plurality of components, multiplying each score in the vector corresponding to that component with a specified constant.

47. The system of claim 26, wherein:
the processing unit comprises a custom processor adapted to analyze the plurality of documents using natural language processing (NLP), wherein analysis from the NLP is expressed using one or more labels associated with the second index space, thereby describing latent information contained in the data; or
the instructions further program the processing unit to analyze the plurality of documents using NLP, wherein analysis from the NLP is expressed using one or more labels associated with the second index space, thereby describing latent information contained in the data.

48. The system of claim 47, wherein:
the NLP comprises topic modeling; and
the custom processor is programmed to or the instructions program the processing unit to identify one or more topics from the plurality of documents and to express each topic in terms of a sequence of probabilities, wherein each probability corresponds to a respective label in the common label sequence.

49. The system of claim 48, wherein topic modeling comprises one or more of: Latent Dirichlet Allocation (LDA), Hierarchical Dirichlet Process (HDP), Dynamic Topic Model (DTM), and Hierarchical LDA (HLDA).

50. The system of claim 48, wherein the topic modeling comprises automatically determining a number of topics to be identified.

51. The system of claim 48, wherein the first dataset comprises a first tensor having N modes, wherein N $\geq 3$, the instructions further program the processing unit to:
partition at least one topic as a set of archetype components, wherein each archetype component corresponds to a respective mode of the first tensor and comprises one or more probability values associated with one or more labels of the respective mode; and
scaling each probability value for each archetype component such that sum of the probability values in each archetype is equal to 1.0.

* * * * *